US010120456B2

(12) United States Patent
Fuchikami et al.

(10) Patent No.: US 10,120,456 B2
(45) Date of Patent: Nov. 6, 2018

(54) WEARABLE TERMINAL AND DISPLAY CONTROL METHOD

(71) Applicant: Panasonic Intellectual Property Corporation of America, Torrance, CA (US)

(72) Inventors: Tetsuji Fuchikami, Osaka (JP); Kazuki Funase, Osaka (JP); Akinori Ozeki, Osaka (JP); Hideshi Aoki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 172 days.

(21) Appl. No.: 15/412,190

(22) Filed: Jan. 23, 2017

(65) Prior Publication Data
US 2017/0220123 A1  Aug. 3, 2017

(30) Foreign Application Priority Data

Jan. 29, 2016 (JP) .................................. 2016-016690
Oct. 14, 2016 (JP) .................................. 2016-203125

(51) Int. Cl.
*G06F 3/01* (2006.01)
*G06F 3/0346* (2013.01)
(Continued)

(52) U.S. Cl.
CPC .............. *G06F 3/017* (2013.01); *G06F 1/163* (2013.01); *G06F 1/1694* (2013.01);
(Continued)

(58) Field of Classification Search
CPC ..... G06F 1/00; G06F 1/16; G06F 1/26; G06F 1/32; G06F 1/166; G06F 3/01; G06F 3/03;
(Continued)

(56) References Cited

U.S. PATENT DOCUMENTS

| 9,009,516 | B1* | 4/2015 | Gabayan | ............... | G06F 1/3206 |
| | | | | | 713/323 |
| 2009/0195497 | A1* | 8/2009 | Fitzgerald | ............. | G06F 1/3203 |
| | | | | | 345/156 |
| 2011/0304648 | A1* | 12/2011 | Kim | ..................... | G06F 1/1626 |
| | | | | | 345/633 |

FOREIGN PATENT DOCUMENTS

JP  2000-065967  3/2000

* cited by examiner

*Primary Examiner* — Chanh Nguyen
*Assistant Examiner* — Nguyen H Truong
(74) *Attorney, Agent, or Firm* — Greenblum & Bernstein, P.L.C.

(57) ABSTRACT

In a wearable terminal, a controller determines whether a direction of a display surface detected by a detector is within a first angle range. In a case where a latest direction of the display surface is out of the first angle range, the controller puts the display in a sleep state, but otherwise the controller puts the display in an active state. Furthermore, the controller specifies a second angle range from the second reference direction. The controller switches the display from the sleep state to the active state in a case the controller determines that the plurality of directions of the display surface detected in the first period and that the direction of the display surface newly detected by the detector is out of the second angle range. In the second display control, the display is switched from the sleep state to the active state even when the newly detected direction of the display surface is out of the first angle range.

18 Claims, 21 Drawing Sheets

(51) Int. Cl.
  *G06F 21/81* (2013.01)
  *G06F 1/16* (2006.01)
  *G06F 1/32* (2006.01)
(52) U.S. Cl.
  CPC .......... *G06F 1/3215* (2013.01); *G06F 1/3265* (2013.01); *Y02D 10/153* (2018.01)
(58) Field of Classification Search
  CPC ...... G06F 3/038; G06F 3/0346; G06F 3/0488; G06F 3/0481; H04M 1/725
  See application file for complete search history.

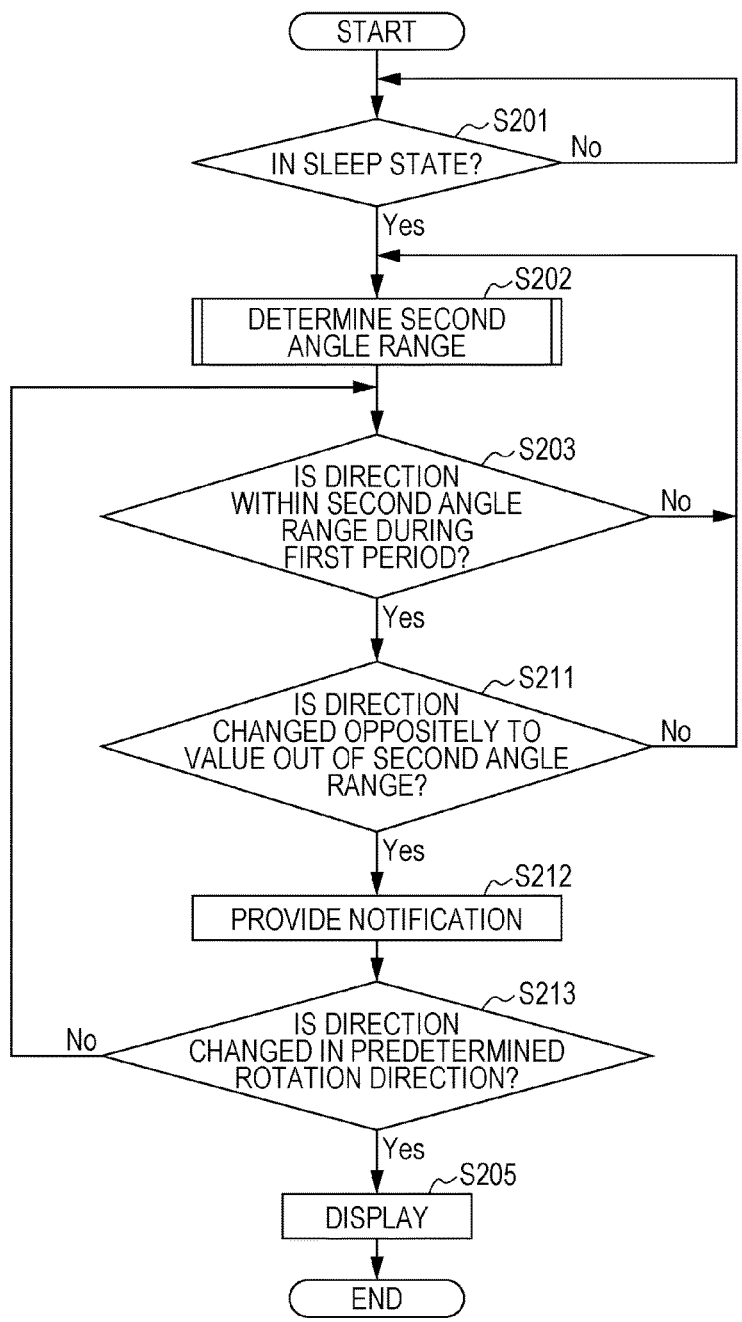

WEARABLE TERMINAL AND DISPLAY CONTROL METHOD

BACKGROUND

1. Technical Field

The present disclosure relates to a wearable terminal that detects a position and switches a display into a sleep state depending on the detected position, and a display control method.

2. Description of the Related Art

In a technique associated with a liquid crystal display watch, it is known to detect a position of the watch and control the liquid crystal element depending on the detected position such that when the detected position is in a fixed angle range, the liquid crystal element is allowed to perform displaying, but when the detected position is out of the fixed angle range, displaying by the liquid crystal element is stopped (see, for example, Japanese Unexamined Patent Application Publication No. 2000-65967). In this technique disclosed in Japanese Unexamined Patent Application Publication No. 2000-65967, it is intended to increase the battery life of the liquid crystal display watch.

However, a further improvement is needed in the technique disclosed in Japanese Unexamined Patent Application Publication No. 2000-65967.

SUMMARY

In one general aspect, the techniques disclosed here feature a wearable terminal for being worn on a forearm of a user, including a display that displays information in an active state and that does not display the information in a sleep state, a detector that detects a direction of a display surface of the display at different times, and a controller that performs: a first determination that determines whether the detected direction by the detector at a latest time is within a first angle range defined by a rotation angle of the display surface from a first reference direction about a rotation axis defined by each of at least two axes in a 3-dimensional space; and a first display control (i) that puts the display in the sleep state in a case where a result of the first determination indicates that the detected direction by the detector at the latest time is out of the first angle range, and (ii) that puts the display in the active state in a case where the result of the first determination indicates that the detected direction by the detector at the latest time is within the first angle range. The controller further performs: a specification that specifies a second angle range which is defined by a rotation angle of the display surface from the second reference direction about a rotation axis defined by each of at least two axes in the 3-dimensional space and which is out of the first angle range, wherein the second reference direction is defined in a direction identified using at least one of directions of the display surface detected at the different times; a second determination that determines whether the plurality of directions of the display surface detected in a first period with a first predetermined length till a present time remain in the determined second angle range; a third determination that determines whether a direction of the display surface newly detected by the detector is out of the second angle range in a case where a result of the second determination indicates that the plurality of directions of the display surface detected in the first period remain in the second angle range; and a second display control that switches the display from the sleep state to the active state in a case where a result of the third determination indicates that the direction of the display surface newly detected by the detector is out of the second angle range, wherein in the second display control, the display is switched from the sleep state to the active state even when the newly detected direction of the display surface is out of the first angle range.

The aspect described above makes it possible to achieve a further improvement.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 23 is a flow chart illustrating an example of a second display control on the wearable terminal according to a second modification of the second embodiment.

DETAILED DESCRIPTION

Figure 1:
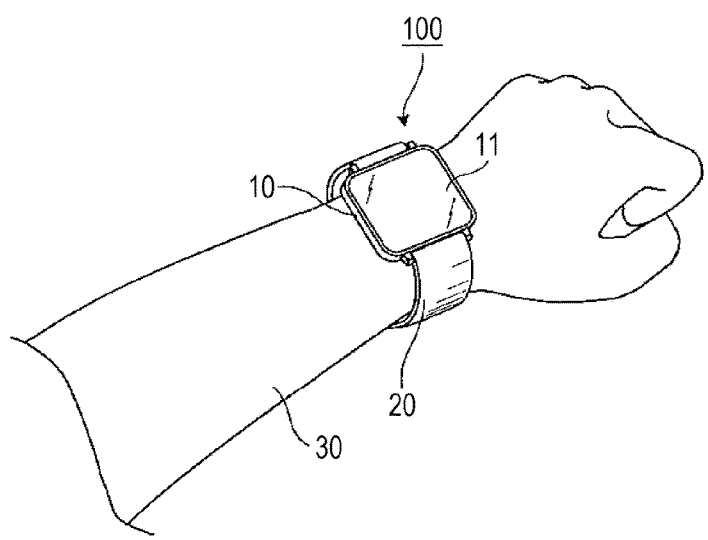
FIG. 1 is an external view of a wearable terminal according to a first embodiment.

Underlying Knowledge Forming Basis of the Present Disclosure

It has been found by the inventor that problems described below may occur in the liquid crystal display watch described in the section "2. Description of the Related Art".

In the technique disclosed in Japanese Unexamined Patent Application Publication No. 2000-65967, a terminal displays a clock on a liquid crystal. However, in recent years, a wearable terminal has been developed that is capable of displaying not only a clock but other images or GUIs (Graphic User Interfaces) on a liquid crystal display. An example of such a wearable terminal is a watch-type wearable terminal that is to be worn, for example, on an arm. In such a kind of wearable terminal, in order to increase the maximum continuous use time allowed by a single charge of a battery, it is known to switch the liquid crystal display to the sleep state depending on the position as disclosed in Japanese Unexamined Patent Application Publication No. 2000-65967. For example, in some wearable terminal, when a user raises his/her one arm to a position that allows the user to watch the liquid crystal display of the wearable terminal, the change in the position of the wearable terminal triggers the liquid crystal display to return from the sleep state, the liquid crystal display performs a displaying operation.

However, in a situation in which a baggage or the like is held by a hand of one arm on which a watch-type wearable terminal is worn, or in a situation in which a strap or the like is held in a train, a bus, or the like, or in a situation in which a user is riding a bicycle, or in other similar situations, it is difficult to achieve a position that allows it to make the wearable terminal return from the sleep state using the technique disclosed in Japanese Unexamined Patent Application Publication No. 2000-65967, and thus the user has to operate the wearable terminal with his/her other hand to cancel the sleep state. In a case where the other hand is also used to hold a baggage or the like, to make the wearable terminal return from the sleep state, a user has to remove his/her hand from the strap or from a handlebar of the bicycle, or the user has to temporarily remove the baggage from his/her hand, and thus it is not easy to make returning from the sleep state.

It may be possible to loose a condition for returning from the sleep state, for example, such that it is allowed to cancel the sleep state when a movement of the wearable terminal is detected. However, this results in a reduction in degree of energy saving, which results in a reduction in maximum continuous use time allowed by a single charge of a battery.

To achieve an improvement in functionality of the wearable terminal, techniques described below have been presented.

In an aspect, the present disclosure provides a wearable terminal for being worn on a forearm of a user, including a display that displays information in an active state and that does not display the information in a sleep state, a detector that detects a direction of a display surface of the display at different times, a controller that performs: a first determination that determines whether the detected direction by the detector at a latest time is within a first angle range defined by a rotation angle of the display surface from a first reference direction about a rotation axis defined by each of at least two axes in a 3-dimensional space; and a first display control (i) that puts the display in the sleep state in a case where a result of the first determination indicates that the detected direction by the detector at the latest time is out of the first angle range and (ii) that puts the display in the active state in a case where the result of the first determination indicates that the detected direction by the detector at the latest time is within the first angle range. The controller further performs; a specification that specifies a second angle range which is defined by a rotation angle of the display surface from the second reference direction about a rotation axis defined by each of at least two axes in the 3-dimensional space and which is out of the first angle range, wherein the second reference direction is defined in a direction identified using at least one of directions of the display surface detected at the different times; a second determination that determines whether the plurality of directions of the display surface detected in a first period with a first predetermined length till a present time remain in the determined second angle range; a third determination that determines whether a direction of the display surface newly detected by the detector is out of the second angle range in a case where a result of the second determination indicates that the plurality of directions of the display surface detected in the first period remain in the second angle range; and a second display control that switches the display from the sleep state to the active state in a case where a result of the third determination indicates that the direction of the display surface newly detected by the detector is out of the second angle range, wherein in the second display control, the display is switched from the sleep state to the active state even when the newly detected direction of the display surface is out of the first angle range.

According to this aspect, it is possible to easily make the display return from the sleep state even in a situation in which a wrist, on which the wearable terminal is worn, is restricted in movement. Therefore, even in such a situation, a user is allowed to easily get information from the wearable terminal. Detecting of a movement of the wearable terminal does not simply cause the display to be returned from the sleep state, and thus it is possible to reduce the consumption power to as low a level as possible.

The at least one of the directions of the display surface may include a plurality of directions of the display surface each of which is detected at different times by the detector in a second period with a second predetermined length until the present time, and in the specification, the controller may define the second reference direction by an average direction of the plurality of directions of the display surface detected by the detector in the second period, and may specify, as the second angle range, an angle range defined using predetermined values indicating angles from the second reference direction.

Thus, it is possible to dynamically determine the second angle range by a simple method.

The at least one of the directions of the display surface may include a plurality of directions of the display surface each of which is detected at different times by the detector in the second period with the second predetermined length until the present time, and in the specification, the controller may performs a fourth determination that determines whether there is a periodic change in the plurality of directions of the display surface detected by the detector in the second period, and in a case where a result of the fourth determination indicates that there is the periodic change, the controller may specify the second angle range from the plurality of detected directions of the display surface such that the second angle range is defined by an angle range defined by a maximum value and a minimum value of the rotation angles of the display surface about each of the at least two axes.

Thus, it is possible to dynamically determine the second angle range by a simple method.

In the second display control, the display is switched from the sleep state to the active state in the second control when the result of the third determination indicates that the direction of the display surface newly detected by the detector has changed in a predetermined rotation direction about one of the two axes until the direction of the display surface is out of the second angle range.

Thus, the display returns from the sleep state only when a user moves the wearable terminal such that the display surface faces a user's face, and thus it is possible to prevent the display from being uselessly returned from the sleep state.

The wearable terminal may include a main part including the display, the detector, and the controller, and a band whose two ends are respectively connected to two ends of the main part and which is wrapped together with the main part, in a ring form, around the forearm, wherein the at least two axes in the 3-dimensional space may include a first axis corresponding to a winding axis about which the band is wrapped, and a second axis corresponding to a rotation axis extending in a direction passing through the two ends, and the predetermined rotation direction may be one of rotation directions including a clockwise rotation direction about a rotation axis given by the first axis and a counterclockwise rotation direction about the rotation axis given by the first axis.

The controller may display information on the display in a manner different for the first display control and the second display control.

This makes it possible for a user to easily watch information displayed on the display surface even in a situation in which it may be difficult for the user to watch the display surface.

The controller may set an image size or a font size to be larger in the second display control than in the first display control.

The controller may set the intensity of a back light of the display to be higher in the second display control than in the first display control.

The controller may set the contrast of information displayed on the display to be higher in the second display control than in the first display control.

In the first display control, the controller may switch the display from the active state to the sleep state when a first displaying period has elapsed since the controller switched the display from the sleep state to the active state in the first display control. In the second display control, the controller may switch the display from the active state to the sleep state when a second displaying period longer than the first displaying period has elapsed since the controller switched the display from the sleep state to the active state in the second display control.

In a case where the controller switches the display from the sleep state to the active state in the second display control, the controller may determine a length of the second displaying period depending on an application displayed in response to the switching from the sleep state to the active state.

In a case where the result of the second determination indicates that the plurality of directions of the display surface detected in the first period remain in the second angle range, the controller may control the notificator to provide a notification of this fact to a user.

Thus even in a situation in which a wrist, on which the wearable terminal is worn, is restricted in movement, it is possible to easily make the display return from the sleep state simply by changing the position of the wearable terminal after a notification is received from the notificator. That is, it is possible to effectively make the display return from the sleep state.

The wearable terminal may further include a notificator, and the third determination may be a determination as to whether the newly detected direction of the display surface is deviated in a direction opposite to the predetermined rotation direction out of the second angle range. The controller may further control the notificator to notify a user that the display is to be switched from the sleep state to the active state when the direction of the display surface detected next time has a change toward the predetermined rotation direction, in a case where the result of the third determination indicates that the newly detected direction of the display surface is deviated in a direction opposite to the predetermined rotation direction out of the second angle range.

Thus when the newly detected direction of the display surface has a change in the opposite direction until the direction of the display surface is out of the second angle range, a notification of this fact is provided to a user. Therefore, by changing the direction of the display in the opposite rotation direction until the direction is out of the second angle range, a user is allowed to know whether the wearable terminal is in a state in which it is allowed to make the display return from the sleep state. Thus it is possible to more effectively make the display return from the sleep state.

The notificator may provide the notification to the user by vibrating the wearable terminal.

The notificator may provide the notification to the user by generating a sound.

The wearable terminal may further include a communicator that communicates with an external terminal, and the notificator may send a notification to the external terminal via the communicator.

The notificator may provide the notification to the user by emitting light.

In an aspect, the present disclosure provides a display control method performed by a wearable terminal, the wearable terminal including a display that displays information in an active state and that does not display the information in a sleep state, a detector that detects a direction of a display surface of the display at different times, and a processor. The display control method causes the processor to perform: a first determination that determines whether the detected direction by the detector at a latest time is within a first angle range defined by a rotation angle of the display surface from a first reference direction about a rotation axis defined by each of at least two axes in a 3-dimensional space; a first display control (i) that puts the display in the sleep state in a case where a result of the first determination indicates that the detected direction by the detector at the latest time is out of the first angle range and (ii) that puts the display in the active state in a case where the result of the first determination indicates that the detected direction by the detector at the latest time is within the first angle range. The display control method further causes the processor to perform: a specification that specifies a second angle range which is defined by a rotation angle of the display surface from a second reference direction about a rotation axis defined by each of at least two axes in the 3-dimensional space and which is out of the first angle range, wherein the second reference direction is defined in a direction identified using at least one of directions of the display surface detected at the different times; a second determination that determines whether the plurality of directions of the display surface detected in a first period with a first predetermined length till a present time remain in the determined second angle range; a third determination that determines whether a direction of the display surface newly detected by the detector is out of the second angle range in a case where a result of the second determination indicates that the plurality of directions of the display surface detected in the first period remain in the determined second angle range; and a second display control that switches the display from the sleep state to the active state in a case where a result of the third determination indicates that the direction of the display surface newly detected by the detector is out of the second angle range, wherein, in the second display control, the display is switched from the sleep state to the active state even when the newly detected direction of the display surface is out of the first angle range.

It should be noted that general or specific embodiments may be implemented as a system, a method, an integrated circuit, a computer program, a storage medium, or any selective combination thereof. Part or all of one of the aspects may be combined with part or all of another different aspect, and any such combination also falls within the scope of the present disclosure.

A wearable terminal and a display control method according to an aspect of the present disclosure are described below with reference to specific embodiments in conjunction with drawings.

Note that the embodiments described below are merely examples of implementations of the present disclosure. That is, in the following embodiments of the present disclosure, values, shapes, materials, constituent elements, locations of the constituent elements and manners of connecting the constituent elements, steps, the order of steps, and the like are described by way of example but not limitation. Among constituent elements described in the following embodiments, those constituent elements that are not described in independent claims indicating highest-level concepts of the present disclosure are optional.

First Embodiment

A first embodiment is described below with reference to FIG. 1 to FIG. 10.

1-1. Configuration

A wearable terminal according to the first embodiment described below is capable of changing information displayed on a display depending on a detected position of the wearable terminal.

FIG. 1 is an external view of the wearable terminal according to the first embodiment.

As illustrated in FIG. 1, the wearable terminal 100 is a watch-type terminal for being worn around an arm of a user in a similar manner to a manner in which a watch is worn. The wearable terminal 100 includes a main part 10 and a band 20.

The main part 10 has a shape of a flat rectangle, and includes hardware that realizes functional configurations of a display, a controller, and a detector. The main part 10 includes a display surface 11 which is located, in a state in which the wearable terminal 100 is worn around an arm, on a surface opposite to the arm. Details of the hardware configuration and the functional configuration will be described later. Note that the shape of the main part 10 is not limited to the flat rectangle, but other shapes such as a flat ellipse, a flat circle, or the like may be employed. The main part 10 is made of, for example, metal, glass, resin, or the like.

The band 20 is a band-shaped element whose two ends are respectively connected to corresponding ends of the main part 10 such that the band 20 is allowed to be wrapped together with the main part 10 around an arm of a user. Note that the band 20 does not necessarily need to have a shape that covers, together with the main part 10, all circumference of an arm of a user as long as the band 20 allows the wearable terminal 100 to be worn on the arm of the user. That is, the band may be a band-shaped element having, for example, a form capable of covering, together with the main part 10, four-fifths of the total circumference of an arm. The band 20 may be made of, for example, a resin such as silicone, metal, leather (including artificial leather).

Figure 2:
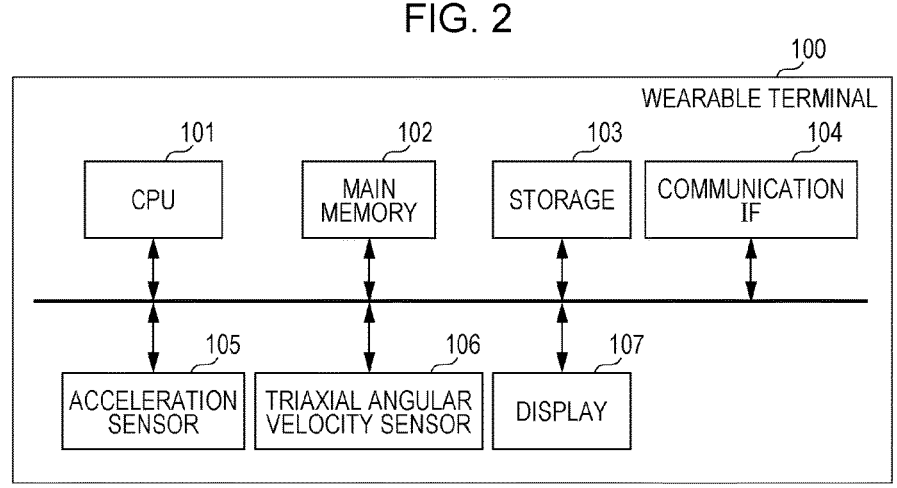
FIG. 2 is a block diagram illustrating a hardware configuration of the wearable terminal according to the first embodiment.

FIG. 2 is a block diagram illustrating a hardware configuration of the wearable terminal according to the first embodiment.

As illustrated in FIG. 2, the wearable terminal 100 includes, as a hardware configuration, a central processing unit (CPU) 101, a main memory 102, a storage 103, a communication interface (IF) 104, an acceleration sensor 105, a triaxial angular velocity sensor 106, and a display 107.

The CPU 101 is a processor that executes a control program stored in the storage 103 or the like.

The main memory 102 is a volatile storage area used as a work area by the CPU 101 when the CPU 101 executes a control program.

The storage 103 is a nonvolatile storage area for storing a control program, content, and/or the like.

The communication IF 104 is a network interface that transmits and receives data to or from another apparatus via a network. The communication IF 104 may be, for example, a wireless local area network (LAN) interface according to, for example, the IEEE802.11a, b, g standard.

The acceleration sensor 105 is a sensor that detects acceleration of the wearable terminal 100.

The triaxial angular velocity sensor 106 is a sensor that detects an angular velocity around each of the three axes defined in different three directions of the wearable terminal 100.

The display 107 is a display apparatus for displaying a video image including a still image. The display 107 may be, for example, a liquid crystal display, an organic EL display, or the like. The display 107 displays the video image in an active state. Also, the display 107 does not display the video image in a sleep state.

Figure 3:
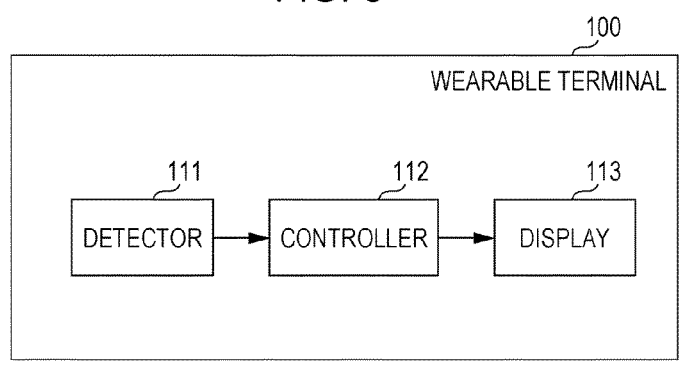
FIG. 3 is a block diagram illustrating a functional configuration of the wearable terminal according to the first embodiment.

FIG. 3 is a block diagram illustrating a functional configuration of the wearable terminal according to the first embodiment.

As illustrated in FIG. 3, the wearable terminal 100 includes, as a functional configuration, a detector 111, a controller 112, and a display 113.

The detector 111 detects the direction of the display surface 11 of the display 113. For example, the detector 111 detects the direction of the display surface 11 of the display 113 at different times. More specifically, for example, the detector 111 may be configured to detect the direction of the display surface 11 of the display 113 at predetermined time intervals. The detector 111 stores, as a detection result in a memory, the direction of the display surface 11 of the display 113 detected at each timing. The direction of the display surface 11 is defined as a direction that is a normal direction of at least part of the display surface 11 and that is directed away from the display surface 11. More specifically, in a case where the display surface 11 is flat, the direction of the display surface 11 is the direction perpendicular to the display surface 11. In a case where the display surface 11 is a curved surface, the direction of the display surface 11 is the normal direction in the center of the display surface 11.

The direction of the display surface 11 of the display 113 is further described below with reference to FIG. 4.

Figure 4:
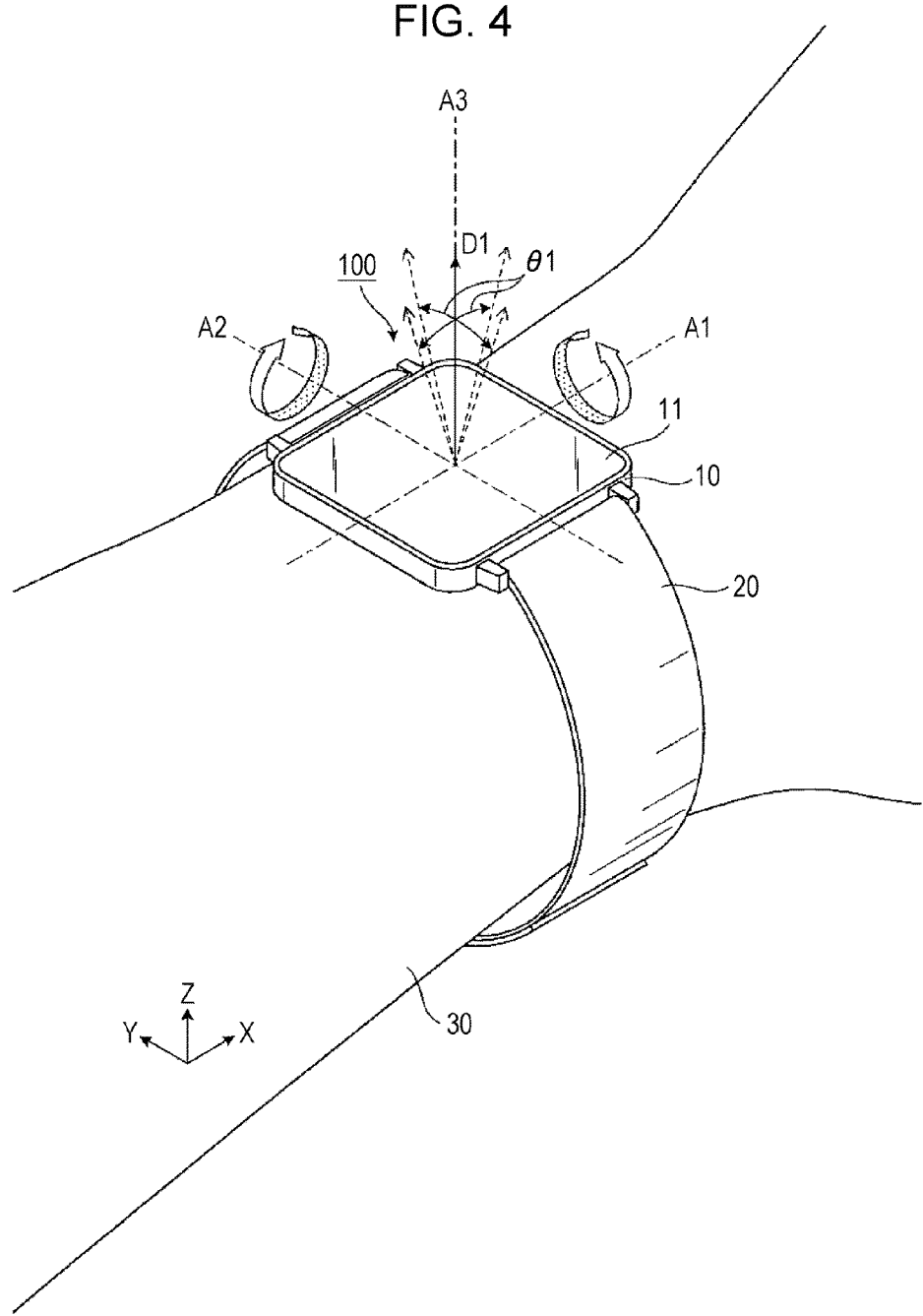
FIG. 4 is a diagram illustrating a direction of a display of the wearable terminal according to the first embodiment.

FIG. 4 is a diagram illustrating the direction of the display surface of the display of the wearable terminal according to the first embodiment.

Herein, as shown in FIG. 4, in a state in which the wearable terminal 100 is worn on a forearm 30, a first axis A1 is a rotation axis extending in the same direction in which the forearm 30 extends. That is, the first axis A1 is a winding axis around which the band 20 is wrapped. Furthermore, in a state in which the display surface 11 of the main part 10 is horizontal and faces upward (in a direction opposite to a direction of gravitational force), a second axis A2 is a rotation axis extending in the same direction in which a line passing through two ends of the main part 10 wherein the two ends are connected to the band 20. Furthermore, as illustrated in FIG. 4, in the state in which the display surface 11 of the main part 10 is in a horizontal position and faces upward (in the direction opposite to the direction of gravitational force), an X-axis direction is defined in a direction parallel to the direction of the first axis A1, and a Y-axis direction is defined in a direction parallel to the direction of the second axis A2. Furthermore, in the state in which the display surface 11 of the main part 10 is in a horizontal position and faces upward (in the direction opposite to the direction of gravitational force), a Z-axis direction is defined in a vertical direction (the direction perpendicular to the display surface 11). Note that a coordinate system defined by the X-axis direction, the Y-axis direction, and the Z-axis direction is not dependent on the position of the wearable terminal 100.

In this case, the direction of the display surface 11 is denoted, for example, by an arrow D1 (hereinafter referred to as the direction D1 of the display surface 11). Note that the above-described definition of the direction D1 of the display surface 11 is merely an example and the definition is not limited to this example. The direction D1 of the display surface 11 may be defined in another direction as long as the definition identifies the direction with respect to the display surface 11. The detector 111 detects a first rotation angle of the display 113 of the wearable terminal 100 in a first rotation direction about a rotation axis defined by the first axis A1. The detector 111 may also detect a second rotation angle of the display 113 of the wearable terminal 100 in a second rotation direction about a rotation axis defined by the second axis A2 different from the first axis A1. The detector 111 may also detect a third rotation angle of the display 113 of the wearable terminal 100 in a third rotation direction about a rotation axis defined by the third axis A3 different from the first axis A1 and the second axis A2. That is, the detector 111 is realized by the triaxial angular velocity sensor 106. In the present embodiment, the first axis A1, the second axis A2, and the third axis A3 are perpendicular to each other. Note that the specific example of the detector 111 is not limited to the triaxial angular velocity sensor 106. For example, the detector 111 may be realized by the acceleration sensor 105 or by a combination of the acceleration sensor 105 and the triaxial angular velocity sensor 106.

The detector 111 shown in FIG. 3 is described in further detail below with reference to FIG. 5 and FIG. 6 for a case in which the direction D1 of the display surface 11 detected by the detector 111 is within a first angle range $\theta 1$.

Figure 5:
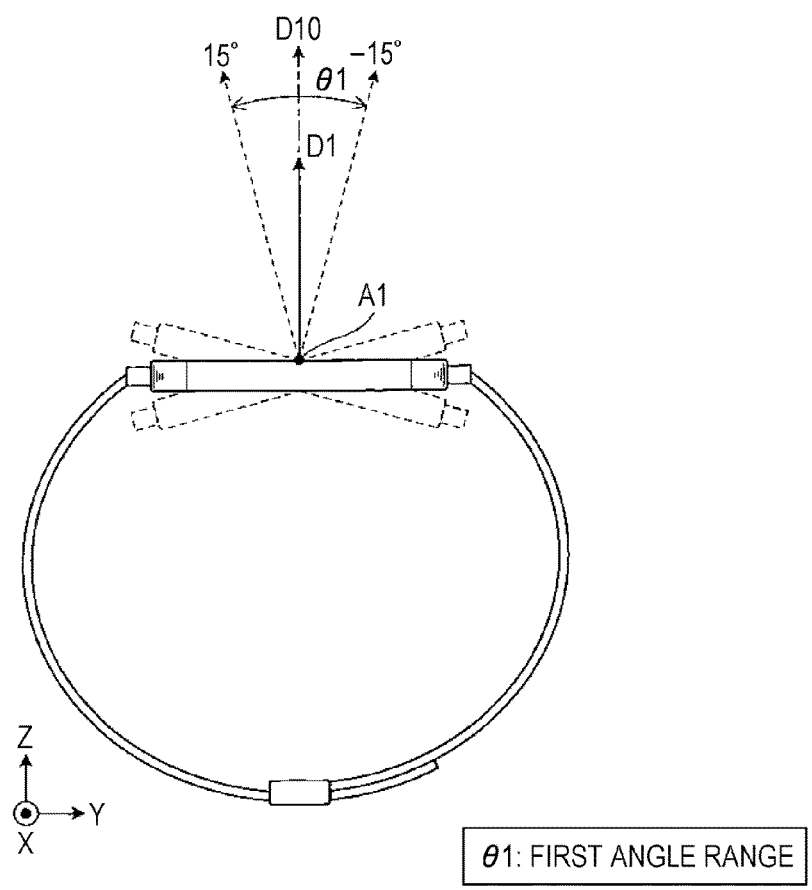
FIG. 5 is a diagram illustrating a wearable terminal seen from a direction of a first axis in a state in which the direction of a display surface is within a first angle range.

FIG. 5 is a diagram illustrating the display 113 in a state in which the direction of the display surface 11 of the display 113 is within the first angle range $\theta 1$ and the display 113 is seen from the direction of the first axis A1. FIG. 6 is a diagram illustrating the display 113 in a state in which the direction of the display surface 11 of the display 113 is within the first angle range $\theta 1$ and the display 113 is seen from the direction of the second axis A2.

Figure 6:
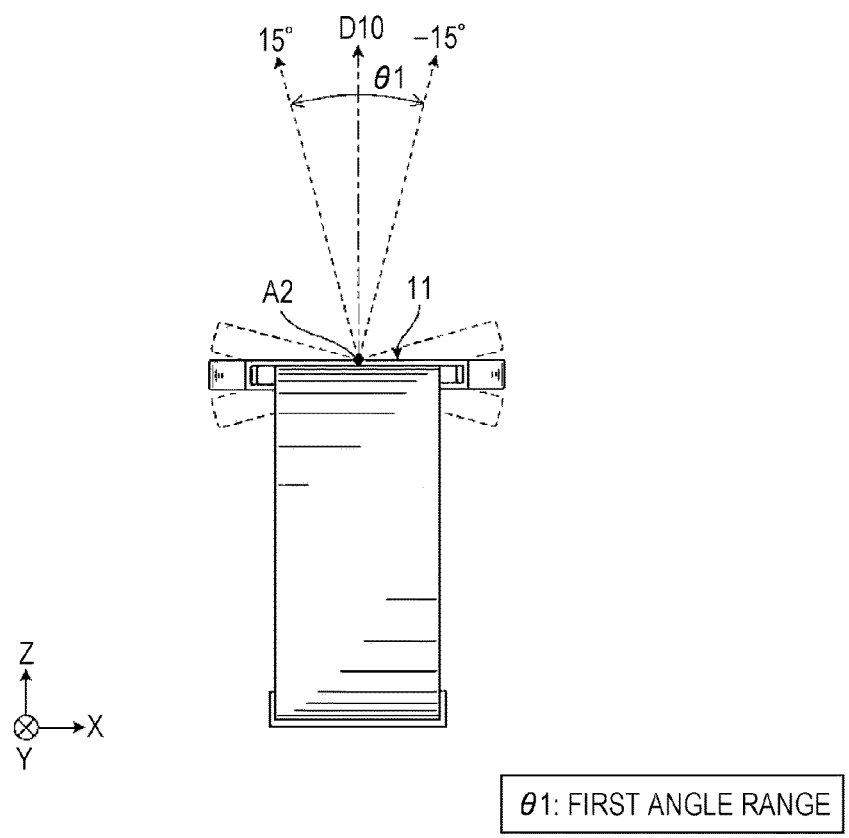
FIG. 6 is a diagram illustrating a wearable terminal seen from a direction of a second axis in a state in which the direction of a display surface is within a second angle range.

First, a first reference position is defined as a position in which, as illustrated in FIG. 5 and FIG. 6, the display surface 11 of the display 107 of the display 113 is horizontal with respect to the ground and faces upward (in a direction away from the ground), and the first rotation angle and the second rotation angle are both defined from the first reference position. That is, the first rotation angle is defined as 0° (the first reference position) when the display surface 11 is substantially perpendicular to the gravitational direction and the display surface 11 faces upward (in the direction opposite to the gravitational direction), and the first rotation angle is defined by an angle of the display surface 11 about the rotation axis taken in the first axis A1 from 0°. Similarly, the second rotation angle is defined by an angle of the display surface 11 about the rotation axis taken in the second axis A2 from 0° from the first reference position. A direction of the display surface 11 in the first reference position is referred to as a first reference direction.

The first angle range $\theta 1$ is defined, as illustrated in FIG. 5, as a range of an angle, for example, from −15° (inclusive) to 15° (exclusive) in terms of the angle in the first rotation direction about the rotation axis defined by the first axis A1 when the first reference position is defined as 0°. Furthermore, the first angle range $\theta 1$ is defined, as illustrated in FIG. 6, as a range of an angle, for example, from −15° (inclusive) to 15° (exclusive) in terms of the angle in the second rotation direction about the rotation axis defined by the second axis A2 when the first reference position is defined as 0°. That is, when the display surface 11 facing the first reference direction is rotated about at least two axes (the first axis A1 and the second axis A2) given as rotation axes in a 3-dimensional space with reference to a particular direction D10, the first angle range θ1 is defined by two rotation angles about the two rotation axes described above. The first angle range θ1 is defined by an upper limit and a lower limit that are determined in advance. That is, the first angle range θ1 is given by a first predetermined fixed angle range. The first predetermined angle is, for example, 30° in the first rotation direction and, for example, 30° in the second rotation direction. Therefore, the first angle range θ1 is defined, with reference to a predetermined direction (upward vertical direction) D10, by a space of an inverted square pyramid whose vertex is located at an intersection between the first axis A1 and the second axis A2. Note that the first angle range θ1 does not necessarily need to be defined by a space of an inverted square pyramid but by a space of an inverted cone.

In the above-described example, the first angle range θ1 is defined such that the angle range in a positive direction from the first reference position (0°) is equal to the angle range in a negative direction from the first reference position) (0° in both the first rotation direction and the second rotation direction. However, the angle ranges may be different for the positive and negative directions, or the angle range in the negative direction may be set to be equal to zero. In the case where the angle ranges are set to be different for the positive and negative directions, it is necessary to define the polarity of the direction of the angle range such that the angle is positive in the positive direction of the rotation.

For example, in FIG. 5, when the wearable terminal 100 is worn on a left wrist of a user such that the display surface 11 faces in the same direction in which the back of the hand faces, the polarity of the direction of rotation is defined such that it is positive in a direction in which a forearm 30 is rotated about an elbow such that the display surface 11 tilts away from the body of the user. In the example shown in FIG. 5, the wearable terminal 100 is worn on the left wrist of a user. However, in a case where the wearable terminal 100 is worn on a right wrist of a user, the angle range is reversed about the X-axis direction. That is, although the polarity is positive in the counterclockwise rotation direction in the situation shown in FIG. 5, the polarity is positive in the clockwise rotation direction in the case where the wearable terminal 100 is worn on a right wrist. Note that information indicating whether the wearable terminal 100 is worn on a left wrist or a right wrist may be input by a user to the wearable terminal 100 after the wearable terminal 100 is worn. In this case, the controller 112 may determine the polarity of the rotation direction based on the input information. Alternatively, it may be assumed that the wearable terminal 100 is to be worn on a left wrist, and the polarity of the rotation direction may be set in advance such that the polarity is positive in the counterclockwise rotation direction.

In the case where the wearable terminal 100 is worn on a left wrist, a hand is located to the right of the wearable terminal 100 as seen in the figure, and an arm is located left to the wearable terminal 100. Therefore, in the case where the wearable terminal 100 is worn on a left wrist, if the wrist is raised from a state in which the arm is substantially horizontal to a position in which the location of the wrist is higher than the location of an elbow, then the wearable terminal 100 is rotated in the positive direction.

For example, in a case where a user puts his/her forearm 30 so as to be located in front of the body of the user and extend in a horizontal direction in FIG. 6 in order to watch the display surface 11 of the wearable terminal 100, the polarity of the rotation is positive when the arm is twisted in a direction (in the counterclockwise direction in FIG. 6) that causes the display surface 11 to tilt toward the body of the user (in the negative Y-axis direction in FIG. 6). Note that in the second rotation direction, the polarity of the rotation direction is positive in the counterclockwise direction in FIG. 6 regardless of whether the wearable terminal 100 is worn on a left wrist or a right wrist.

The controller 112 controls displaying on the display 113. More specifically, the controller 112 performs a first determination and a first display control that puts the display 113 in the sleep state or the active state based on a result of the first determination. In the first determination, the controller 112 determines from the result of the detection made by the detector 111 whether the direction D1 of the display surface 11 of the display 113 is within the first angle range θ1. In the first display control, when the direction D1 of the display surface 11 is out of the first angle range θ1, the controller 112 puts the display 113 in the sleep state. However, when the direction D1 of the display surface 11 is within the first angle range θ1, the controller 112 puts the display 113 in the active state.

The controller 112 also performs a process of determining the second angle range θ2, a second determination, a third determination, a second display control that switches the display 113 from the sleep state to the active state. Herein, the second angle range θ2 is defined with respect to a direction (a second reference direction) determined using at least one of a plurality of directions D1 of the display surface 11 detected by the detector 111 in a second period with a second predetermined length until the present time. For example, the second angle range θ2 is an angle range out of the first angle range θ1. The second angle range θ2 is defined by rotation angles by which the display surface 11 facing in the second reference direction is rotated about at least two axes (the first axis A1 and the second axis A2) given as rotation axes in a 3-dimensional space. More specifically, for example, the second angle range θ2 is defined by a first rotation angle and a second rotation angle where the first rotation angle is a rotation angle of the direction D1 of the display surface 11 about a rotation axis taken in the first axis A1 from the second reference direction, and the second rotation angle is a rotation angle of the direction D1 of the display surface 11 about a rotation axis taken in the second axis A2 from the second reference direction. The direction determined using at least one of a plurality of directions D1 of the display surface 11 may be one of the plurality of directions D1 of the display surface 11 or may be an average direction of the plurality of directions D1 of the display surface 11. Details of the second angle range θ2 will be described later.

In the second determination, the controller 112 determines, from the result of the detection made by the detector 111, whether a plurality of directions D1 of the display surface 11 detected in the first period with the first predetermined length until the present time remain within the second angle range θ2. In the third determination, when a result of the second determination indicates that the plurality of directions of the display surface 11 detected in the first period has remained in the second angle range θ2, the controller 112 determines whether the direction of the display surface 11 newly detected by the detector 111 is deviated out of the second angle range θ2. In the third determination, a rotation direction in which the direction of the display surface 11 changes may be detected based on a difference between the direction of the display surface 11 detected this time and the previous direction of the display surface 11. More specifically, it may be determined whether the direction of the display surface 11 newly detected this time has a change from the previous direction of the display surface 11 in the clockwise direction or the counterclockwise direction about the first axis A1 given as the rotation axis. Similarly, it may be determined whether the direction of the display surface 11 newly detected this time has a change from the previous direction of the display surface 11 in the clockwise direction or the counterclockwise direction about the second axis A2 given as the rotation axis. In the second display control, in a case where a result of the third determination indicates that the newly detected direction D1 of the display surface 11 has a deviation from the second angle range θ2, the controller 112 switches the display 113 from the sleep state to the active state. In the second display control, the display 113 is switched from the sleep state to the active state even if the newly detected direction D1 of the display surface 11 is out of the first angle range θ1.

The controller 112 may determine the second angle range θ2 using predetermined values indicating an upper limit and a lower limit of the rotation angle about the first axis A1 given as the rotation axis and an upper limit and a lower limit of the rotation angle about the second axis A2 given as the rotation axis from a reference direction (the second reference direction) given by the average of a plurality of directions D1 of the display surface 11 detected by the detector 111 in the second period. That is, the second angle range θ2 may be given by a fixed second predetermined angle range defined by the predetermined values with reference to the second reference direction of the display surface 11.

Furthermore, in the third determination, the controller 112 also determines whether the direction D1 of the display surface 11 has changed in a positive rotation direction given as a predetermined rotation direction until the direction D1 of the display surface 11 is out of the second angle range θ2. The predetermined rotation direction (or the positive rotation direction) is one of the clockwise direction and the counterclockwise direction about one of the first axis A1 and the second axis A2. In a case where it is determined in the third determination that the direction D1 of the display surface 11 has changed in the positive rotation direction until the direction D1 of the display surface 11 is out of the second angle range θ2, the controller 112 may make the display 113 return from the sleep state.

The controller 112 may display information on the display 113 in a manner different for the first display control and the second display control. That is, the controller 112 may control the display manner in which displaying is performed by the display 113 when the display 113 returns from the sleep state such that the display manner is different for the first display control and second display control.

More specifically, for example, the controller 112 may set the image size and/or the character font size so as to be greater in the second display control than in the first display control. For example, the controller 112 may control the size of an image such as a graphics, a photographic image, an illustration, or the like, or the size of characters displayed on a screen of an application such that the size displayed when the display 113 is made to return from the sleep state in the second display control is greater, for example, by 10% than displayed when the display 113 is made to return from the sleep state in the first display control.

The controller 112 may control the display mode so as to be different for the first display control and the second display control by controlling the intensity of the back light or by controlling the liquid crystal. For example, the controller 112 may set the intensity of the back light of the display 113 in the second display control to be higher than the intensity of the back light of the display 113 in the first display control. For example, the controller 112 may set the contrast of the information displayed on the display 113 in the second display control to be higher than the contrast of the information displayed on the display 113 in the first display control.

For example, the controller 112 may set the length of a period during which information is displayed before the display 113 is switched to the sleep state next time such that the length is different for the first display control and the second display control.

For example, in the first display control, the controller 112 may switches the display 113 to the sleep state when a first displaying period elapses after the display 113 is made to return from the sleep state, while, in the second display control, the controller 112 may switches the display 113 to the sleep state when a second displaying period, longer than the first displaying period, elapses after the display 113 is made to return from the sleep state. More specifically, for example, in the first display control, the controller 112 may switches the display 113 to the sleep state when a period of one minute elapses after the display 113 is made to return from the sleep state, while, in the second display control, the controller 112 may switches the display 113 to the sleep state when a period of two minutes elapses after the display 113 is made to return from the sleep state.

For example, in the second display control, when the controller 112 makes the display 113 return from the sleep state, the controller 112 may set the length of the period during which information is displayed before the display 113 is switched to the sleep state next time such that the length is different depending on the application displayed when the display 113 returns from this sleep state. More specifically, in such a situation, for example, the controller 112 may set the length of the period during which information is displayed before the display 113 is switched to the sleep state such that the length is longer for a case where an application such as a mail application, a messenger application, a news application, or the like in which as many or more characters as specified (for example, 20 characters or more) are displayed is restarted from the sleep state than for case where an application such as a clock, a music player, or the like in which a fixed number of characters are displayed is restarted from the sleep state.

Note that the controller 112 may be realized, for example, by the CPU 101, the main memory 102, and/or the like.

The display 113 displays information in the display area. The display 113 may be realized by the display 107.

1-2. Operation

An operation of the wearable terminal 100 configured in the above-described manner is described below with reference to FIG. 7 to FIG. 15.

First, the first display control on the wearable terminal 100 is described with reference to FIG. 7 and FIG. 8.

Figure 7:
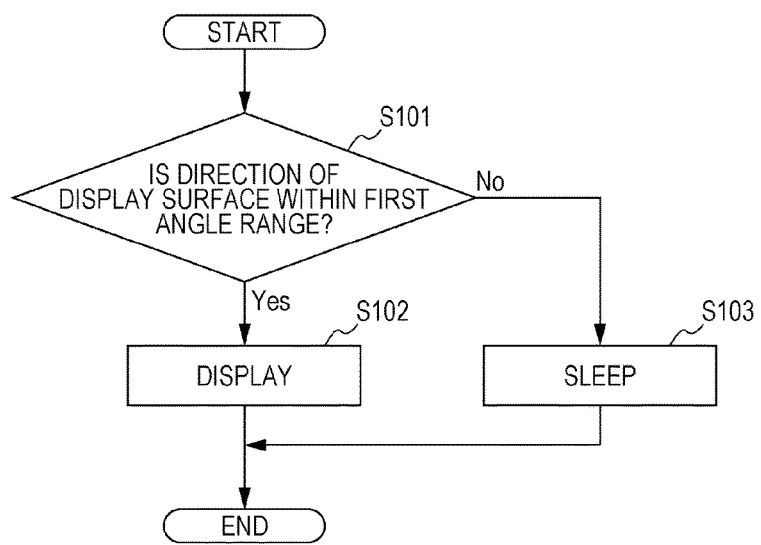
FIG. 7 is a flow chart illustrating an example of a first display control on the wearable terminal according to the first embodiment.
Figure 8:
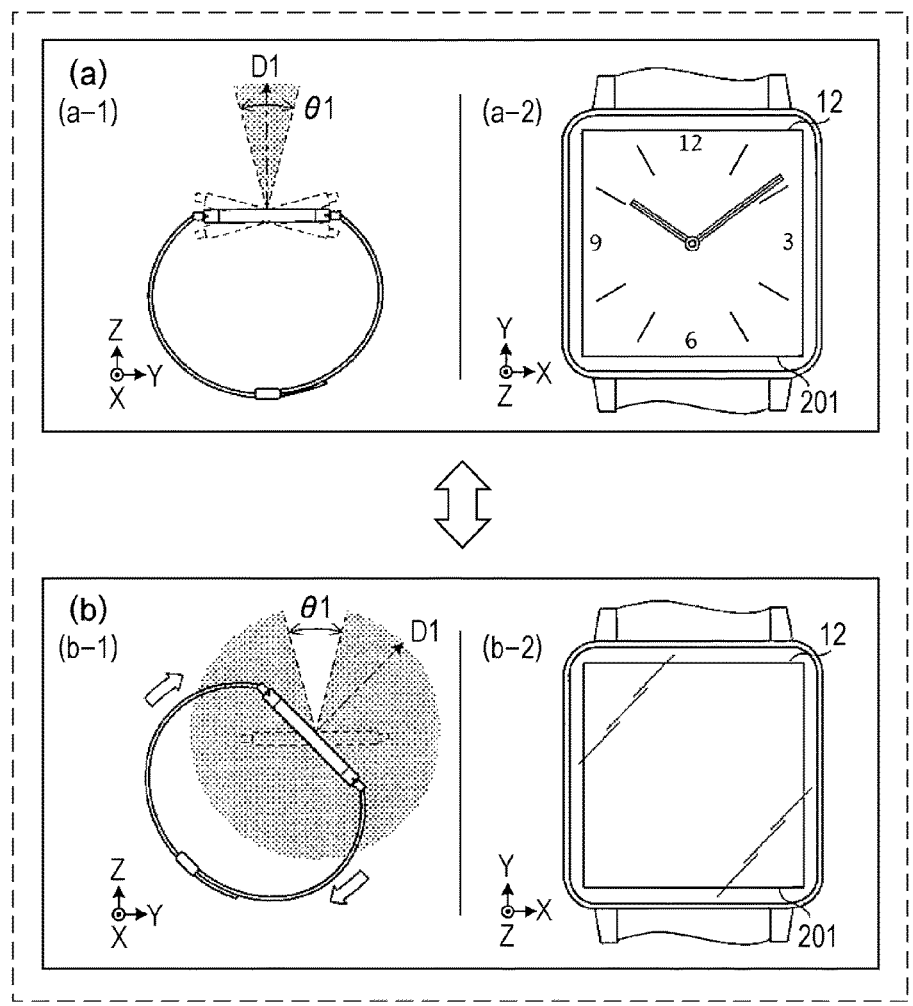
FIG. 8 is a diagram illustrating a manner in which displaying is performed, depending on the position of the wearable terminal, in the first display control by a controller according to the first embodiment.

FIG. 7 is a flow chart illustrating an example of the first display control on the wearable terminal according to the first embodiment. FIG. 8 is a diagram illustrating a manner in which displaying is performed, depending on the position of the wearable terminal, in the first display control by the controller according to the first embodiment. Note that the position of the wearable terminal shown in FIG. 8 is seen from the direction of the first axis A1 and the position of the wearable terminal in the first rotation direction is shown. Note that a similar process is performed also in the second rotation direction, although no figure showing the wearable terminal seen from the direction of the second axis A2 is provided.

FIG. 8(a) illustrates a state in which the direction D1 of the display surface 11 is within the first angle range θ1. In this state, the position of the wearable terminal is shown in FIG. 8(a)(a-1), and the display screen displayed on the display 113 is shown in FIG. 8(a)(a-2). FIG. 8(b) illustrates a state in which the direction D1 of the display surface 11 is out of the first angle range θ1. In this state, the position of the wearable terminal is shown in FIG. 8(b)(b-1), and the display screen displayed on the display 113 is shown in FIG. 8(b)(b-2).

The process shown in the flow chart of FIG. 7 is performed, for example, each time the direction of the display surface 11 is detected by the detector 111. In the first display control, as illustrated in FIG. 7, the controller 112 performs the first determination to determine whether the current direction D1 of the display surface 11 detected by the detector 111 is within a first angle range θ1 (S101). The current direction D1 of the display surface 11 may be defined as follows. Of a plurality of directions of the display surface 11 detected by the detector 111 at different times, a direction of the display surface 11 detected at a latest time is employed as the current direction D1 of the display surface 11.

In a case where the controller 112 determines in the first determination that the current direction D1 of the display surface 11 detected by the detector 111 is within the first angle range θ1 (Yes in S101), the controller 112 controls the display 113 to display proper information in a proper manner depending on the situation (S102). More specifically, for example, in a case where the controller 112 determines that the current direction D1 display surface 11 is within the first angle range θ1, the controller 112 controls the display 113 to display information 201 in a display area 12 of the display 113 as illustrated in FIG. 8(a-2).

The information 201 is information of a particular application executable by the wearable terminal 100. In the present embodiment, the particular application may be, for example, an application of a clock (at least one of an analog clock and a digital clock) that indicates a current time in graphics.

On the other hand, in a case where the controller 112 determines in the first determination that the current direction D1 display surface 11 detected by the detector 111 is not within the first angle range θ1 (that is, the direction D1 display surface 11 is deviated from the first angle range θ1) (No in S101), the controller 112 turns off the displaying on the display 113 and switches the display 113 to the sleep state (S103). As a result of this process by the controller 112, nothing is displayed on the display 113 as illustrated in FIG. 8(b)(b-2).

As described above, in the first display control, the controller 112 switches the mode as to whether displaying is provided on the display 113 or not, depending on whether the current direction D1 of the display surface 11 is within the first angle range θ1 or not. In the first display control, the determination as to whether a user is watching the display surface 11 of the wearable terminal 100 is made by determining whether the direction D1 of the display surface 11 is within the first angle range θ1. In the case where the direction D1 of the display surface 11 is within the first angle range θ1, it is determined that a user is watching the display surface 11. However, in the case where the direction D1 of the display surface 11 is not within the first angle range θ1, it is determined that a user is not watching the display surface 11. As described above, when a user is not watching the display surface 11, the display 113 is switched to the sleep state to achieve a reduction in the consumption power.

The determination as to whether a user is watching the display surface 11 may be performed based not only on the direction D1 of the display surface 11 of the wearable terminal 100, but a result of detection on the movement of the forearm 30 on which the wearable terminal 100 may also be taking into account. For example, in the first display control, in a case where the current direction D1 of the display surface 11 is within the first angle range θ1, and it is determined based on a detection by the acceleration sensor 105 that the forearm 30 is raised upward, it may be determined that a user is watching the display surface 11 and the display 113 may be made to be return from the sleep state.

Note that it is assumed that the first display control is always being performed as long as the wearable terminal 100 is in operation. That is, it is assumed that the first display control is performed in parallel with a second display control described next below.

Next, referring to FIG. 9 to FIG. 15, the second display control on the wearable terminal 100 is described below.

Figure 9:
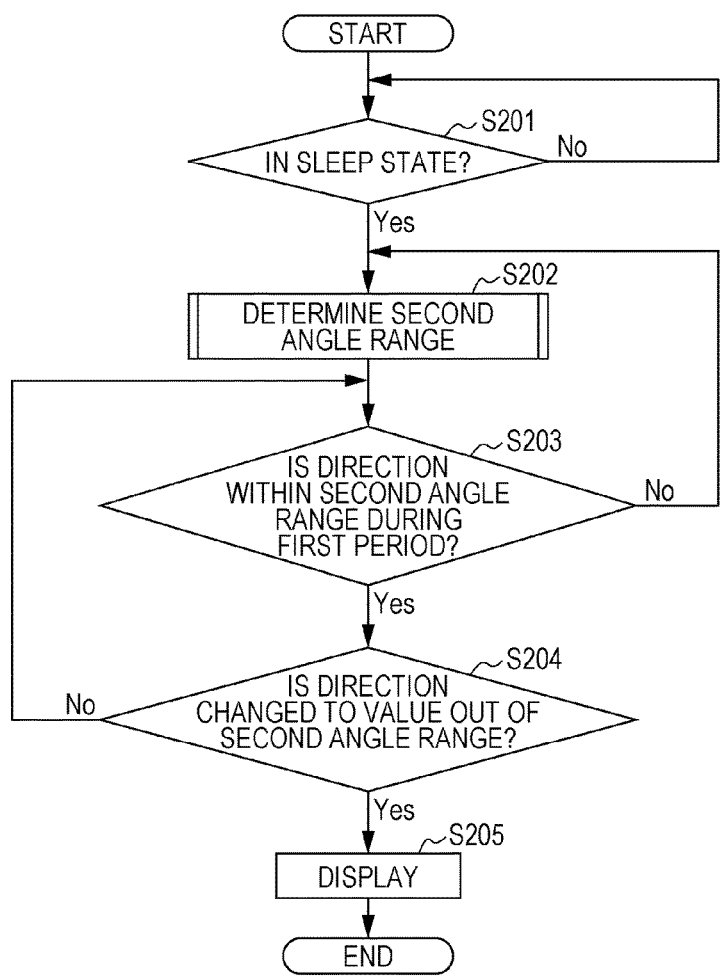
FIG. 9 is a flow chart illustrating a manner in which displaying is performed in the second display control by the controller according to the first embodiment.

FIG. 9 is a flow chart illustrating an example of the second display control on the wearable terminal according to the first embodiment.

As shown in FIG. 9, first, the controller 112 determines whether the display 113 is in the sleep state (S201).

In a case where the controller 112 determines that the display 113 is in the sleep state (Yes in S201), the controller 112 determines the second angle range θ2 (S202). Details of the process of determining the second angle range θ2 will be described below.

Referring to FIG. 10 to FIG. 14, the process of determining the second angle range θ2 performed by the controller 112 is described below.

Figure 10:
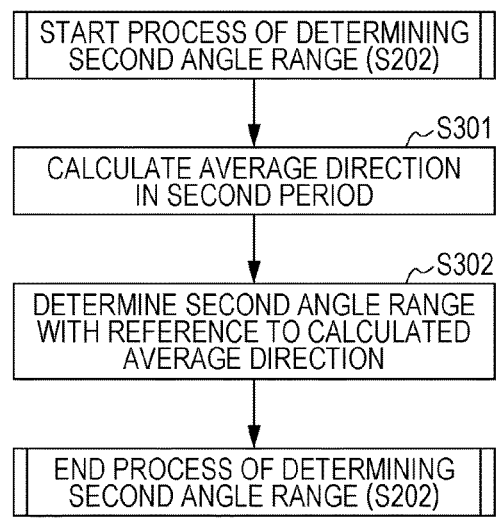
FIG. 10 is a flow chart illustrating an example of a process of determining the second angle range according to the first embodiment.
Figure 11:
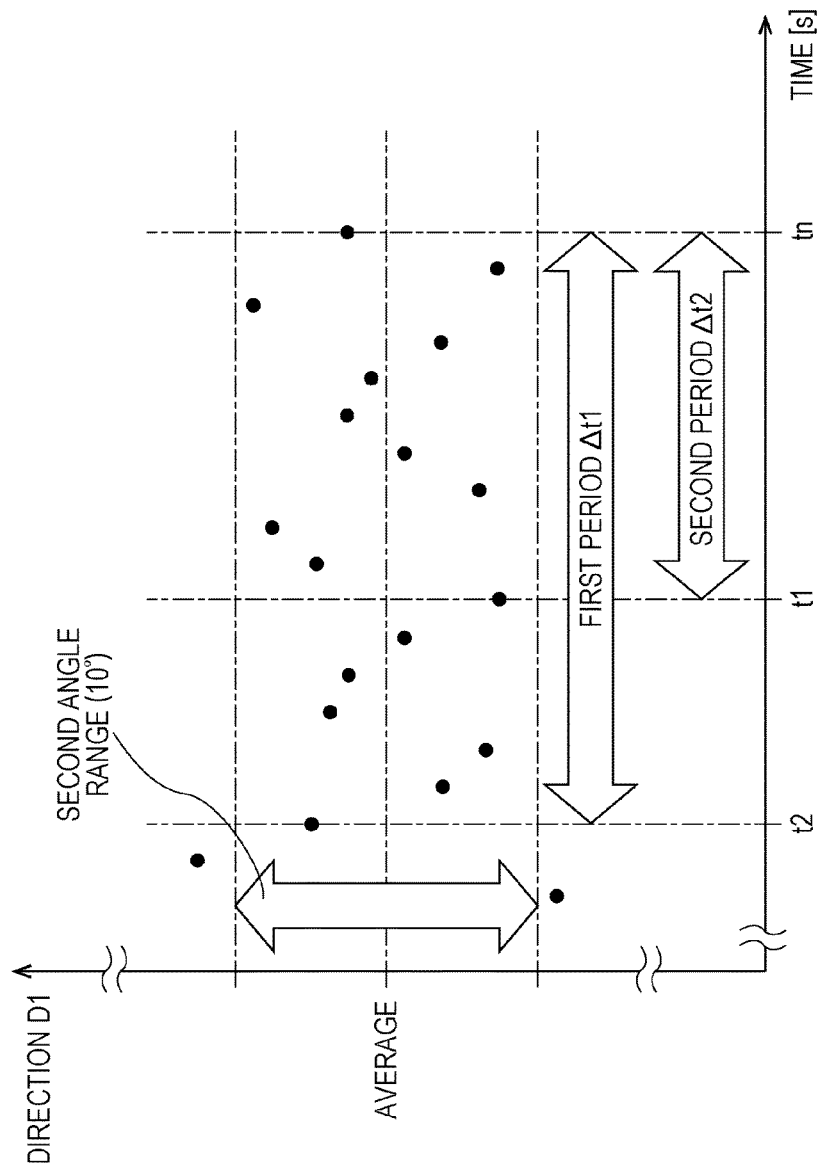
FIG. 11 is a diagram illustrating an example of a direction of a display surface detected by a detector at various times until a current time.
Figure 12:
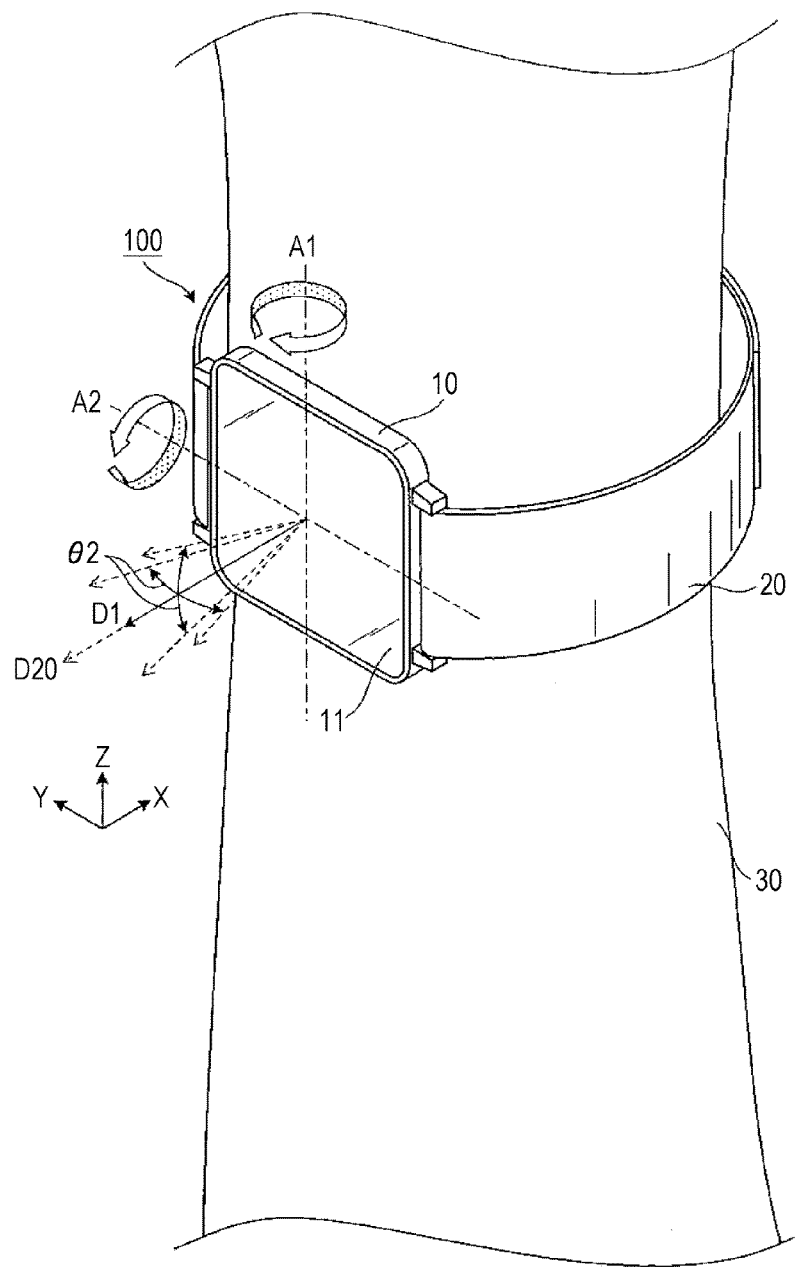
FIG. 12 is a diagram illustrating an example of a situation in which the direction of the display surface of the display of the wearable terminal according to the first embodiment is out of a first angle range.
Figure 13:
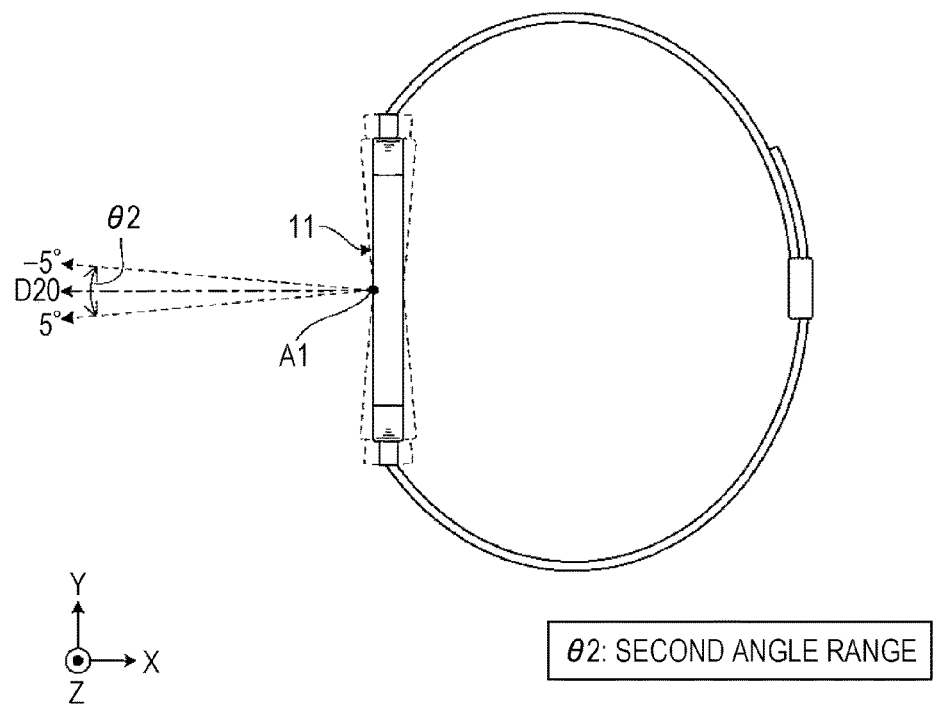
FIG. 13 is a diagram illustrating the display seen from a direction of a first axis in a state in which the direction of the display surface is within a second angle range.
Figure 14:
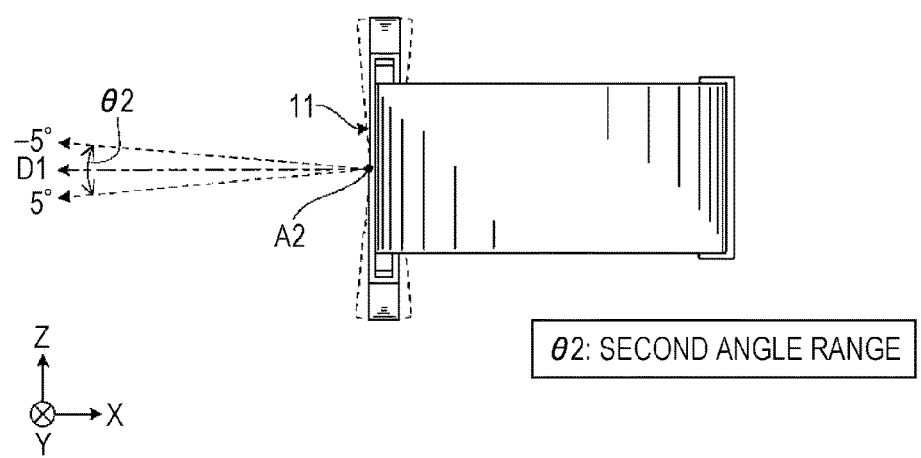
FIG. 14 is a diagram illustrating the display seen from a direction of a second axis in a state in which the direction of the display surface is within the second angle range.

FIG. 10 is a flow chart illustrating an example of a process of determining the second angle range θ2 according to the first embodiment. FIG. 11 is a diagram illustrating an example of the direction of the display surface detected by a detector 111 at various times until the present time. In FIG. 11, by way of example, only a result of detection of the first rotation angle by the detector 111 is shown. FIG. 12 is a diagram illustrating an example of a situation in which the direction of the display surface of the display of the wearable terminal according to the first embodiment is out of the first angle range θ1. Note that FIG. 12 also represents a situation after the second angle range θ2 is determined. FIG. 13 is a diagram illustrating the display seen from the direction of the first axis A1 in a state in which the direction of the display surface is within the second angle range θ2. FIG. 14 is a diagram illustrating the display seen from the direction of the second axis A2 in a state in which the direction of the display surface is within the second angle range θ2.

As illustrated in FIG. 10, in the process of determining the second angle range θ2, first, the controller 112 calculates the average direction from a plurality of directions D1 of the display surface 11 detected by the detector 111 in a second period Δt2 (S301). More specifically, as illustrated in FIG. 11, the direction D1 of the display surface 11 is detected by the detector 111 at predetermined sampling periods for each of the first rotation angle and the second rotation angle. Although the detection result is shown only for the first rotation angle in FIG. 11, the detection is performed also for the second rotation angle. The shorter the sampling period, the more directions D1 of the display surface 11 are detected by the detector 111 in the second period Δt2.

The direction D1 of the display surface 11 detected by the detector 111 is stored as a detection result in, for example, the storage 103 such that the detection result is related to a time at which the direction D1 is detected. In a case where the detector 111 detects the direction D1 of the display surface 11 at the predetermined time intervals, a plurality of detection results are stored in the storage 103. More specifically, the plurality of detection results are stored in the storage 103. Thus, the controller 112 calculates the average direction D20 using the plurality of detection results detected in the second period $\Delta t2$ and stored in the storage 103. For example, the controller 112 calculates the average of the first rotation angles by dividing the sum of a plurality of detection results detected as the first rotation angles in the second period $\Delta t2$ by the number of detection results, and also calculates the average of the second rotation angles by dividing the sum of a plurality of detection results detected as the second rotation angles by the number of detection results. By calculating the average of the first rotation angles and that of the second rotation angles in the above-described manner, the controller 112 calculates the average direction D20 represented by the average of the first rotation angles and the average of the second rotation angles.

Note that the second period $\Delta t2$ is a period from a first time t1 to a present time tn where the first time t1 is a second predetermined time length before the present time tn as illustrated in FIG. 11. Note that the storage 103 may store, of the detection results detected by the detector 111, only the detection results acquired in a past period with a predetermined time length till the present time. That is, the storage 103 may not store all detection results.

Next, employing the calculated average direction of the display surface 11 as a reference direction (a second reference direction), the controller 112 determines the second angle range $\theta 2$ defined using predetermined values (or fixed angles) (S302). More specifically, the controller 112 determines, as the second angle range $\theta 2$, a second predetermined angle range about the average direction D20 given as the reference direction. The second predetermined angle is a predetermined fixed angle, and it may be, for example, 10°. Note that the second angle range $\theta 2$ may be another angle range including the average direction D20, and the second angle range $\theta 2$ is not limited to the angle range within the second predetermined angle about the average direction D20 given as the reference direction. Although it is assumed by way of example that the second predetermined angle is smaller than the first predetermined angle, the second predetermined angle may be equal to the first predetermined angle, or may be greater than the first predetermined angle.

The process of determining the second angle range $\theta 2$ in the second display control is performed in a case where the current direction D1 of the display surface 11 of the wearable terminal 100 is out of the first angle range $\theta 1$, for example, as illustrated in FIG. 12. The situation shown in FIG. 12 may occur, for example, in a case where in a train, a bus, or the like, a user hold a strap or the like with a hand of an arm on which the wearable terminal 100 is worn. Note that the second display control may be applied not only in a situation in which an arm is extended upward as in FIG. 12, but also in a situation in which an arm is extended forward to hold a handlebar of a bicycle or the like, or a situation in which an arm is extended downward to hold a baggage or the like.

As shown in FIG. 13 and FIG. 14, in the first rotation direction and also in the second rotation direction, the second angle range $\theta 2$ is an angle range of 10° with reference to the second reference position in which the display surface 11 faces in the average direction D20. In a situation where the second reference position is defined by a direction whose angle is 0° in the first rotation direction about the rotation axis given by the first axis A1, the second angle range $\theta 2$ is, for example, an angle range from −5° (inclusive) to a 5° (exclusive) as shown in FIG. 13. In a situation where the second reference position is defined by a direction whose angle is 0° in the second rotation direction about the rotation axis given by the second axis A2, the second angle range $\theta 2$ is, for example, an angle range from −5° (inclusive) to a 5° (exclusive) as shown in FIG. 14. The second predetermined angle is, for example, 10° in the first rotation direction, and is, for example, 10° in the second rotation direction. Thus, the second angle range $\theta 2$ is an angle range defined by a space of an inverted square pyramid whose axis extends in the second reference direction defined by the calculated average direction D20 and whose vertex is on an intersection between the first axis A1 and the second axis A2. Note that the second angle range $\theta 2$ is not limited to the angle range defined by the space of the inverted square pyramid but may be an angle range defined by a space of an inverted cone. As described above, unlike the fixed first angle range $\theta 1$, the second angle range $\theta 2$ is an angle range that is dynamically determined depending on the direction D1 of the display surface 11.

Referring again to FIG. 9, after the second angle range $\theta 2$ is determined in step S202, the controller 112 determines whether the directions D1 of the display surface 11 detected at different times in the first period $\Delta t1$ remain in the second angle range $\theta 2$ (S203). In the present example, as shown in FIG. 11, the first period $\Delta t1$ is a period from a second time t2 to the present time tn where the second time t2 is a first predetermined time period before the present time tn. Although it is assumed in the example shown in FIG. 11 that the first period $\Delta t1$ is longer than the second period $\Delta t2$, the first period $\Delta t1$ may be equal to the second period $\Delta t2$ or may be shorter than the second period $\Delta t2$.

In a case where the controller 112 determines, in the second determination, that the plurality of directions D1 of the display surface 11 detected in the first period $\Delta t1$ have remained in the second angle range $\theta 2$ for the first period $\Delta t1$ (Yes in S203), the controller 112 performs a third determination to determine whether the direction D11 of the display surface 11 thereafter goes out of the second angle range $\theta 2$ (S204). If the direction D11 of the display surface 11 remains within the second angle range $\theta 2$ over the first period $\Delta t1$, directions D1 of the display surface 11 detected in the first period $\Delta t1$ are all within the second angle range $\theta 2$. In a case where a large number of directions D1 of the display surface 11 are detected in the first period $\Delta t1$, if, of the plurality of directions D1 of display surface 11 detected in the first period $\Delta t1$, the number of directions D1 of display surface 11 determined as being within the second angle range $\theta 2$ is equal to or greater than a reference value, it may be regarded that the plurality of directions D1 of the display surface 11 detected in the first period $\Delta t1$ have remained within the second angle range $\theta 2$. On the other hand, in a case where the controller 112 determines in the second determination that the direction D1 of the display surface 11 has not remained in the second angle range $\theta 2$ for the first period $\Delta t1$ (No in S203), the processing flow returns to step S202 to perform the process of determining the second angle range $\theta 2$.

In a case where the controller 112 determines in the third determination that the direction D11 of the display surface 11 newly detected by the detector 111 has a deviation from the second angle range $\theta 2$ (that is, the direction D11 has been deviated to the outside of the second angle range $\theta 2$) (Yes in S204), the controller 112 controls the display 113 to return from the sleep state and make the display 113 display information (S205). On the other hand, in a case where the controller 112 determines in the third determination that the direction D11 of the display surface 11 newly detected by the detector 111 has not a change to the outside of the second angle range θ2 (that is, the direction D11 remains within the second angle range θ2) (No in S204), the processing flow returns to step S203.

Figure 15:
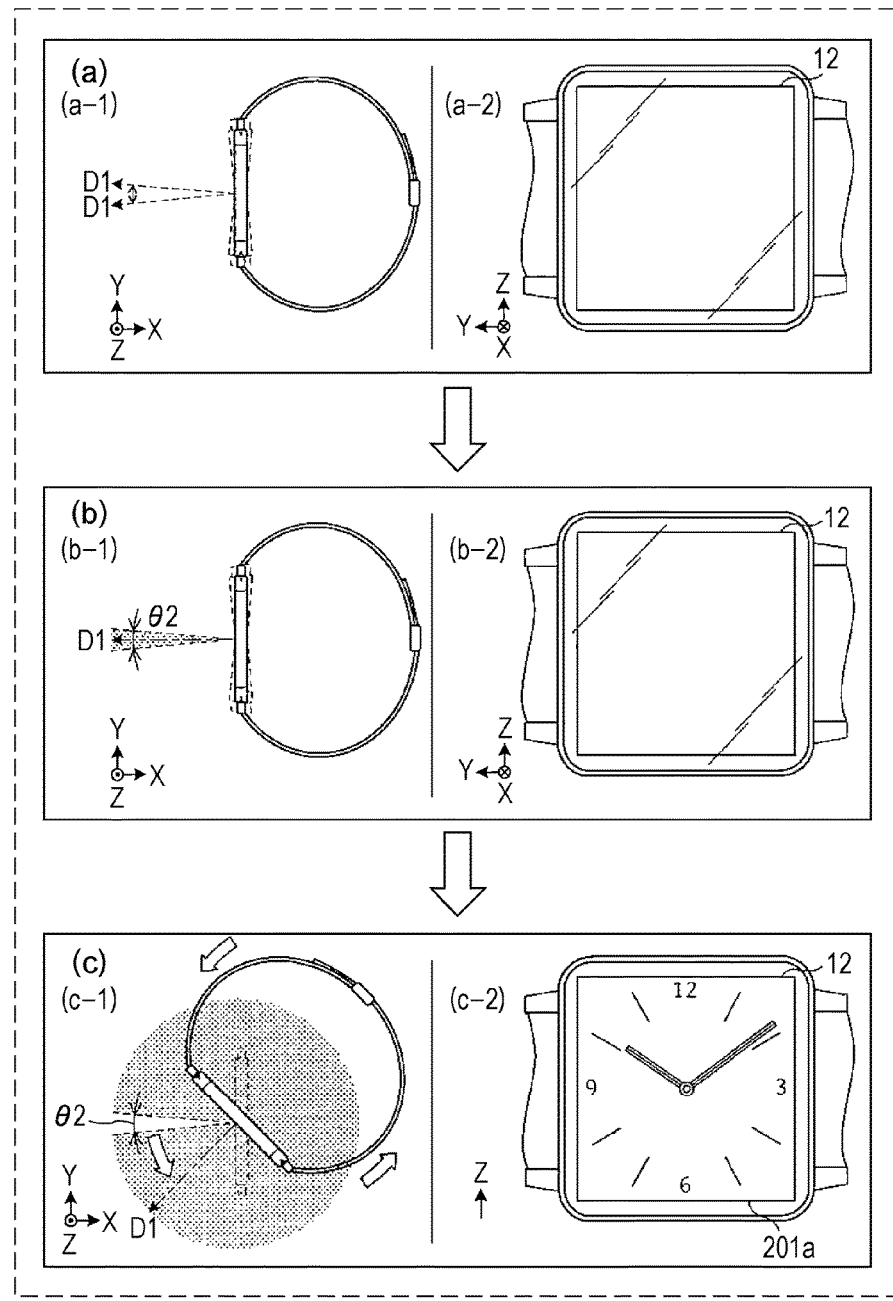
FIG. 15 is a diagram illustrating a manner in which displaying is performed, depending on the position of the wearable terminal, in a second display control by the controller according to the first embodiment.

FIG. 15 is a diagram illustrating a manner in which displaying is performed, depending on the position of the wearable terminal, in the second display control by the controller according to the first embodiment. Note that the wearable terminal shown in FIG. 15 is seen from the direction of the first axis A1 and the position of the wearable terminal in the first rotation direction is shown. Note that a similar process is performed also in the second rotation direction, although no figure showing the wearable terminal seen from the direction of the second axis A2 is provided.

FIG. 15(a) illustrates the wearable terminal in a state in which the second angle range θ2 has not yet been determined and the direction D1 of the display surface 11 is out of the first angle range θ1. In this state, the position of the wearable terminal is shown in FIG. 15(a)(a-1), and the display screen displayed on the display 113 is shown in FIG. 15(a)(a-2). FIG. 15(b) illustrates a state in which the direction D1 of the display surface 11 is within the second angle range θ2. In this state, the position of the wearable terminal is shown in FIG. 15(b)(b-1), and the display screen displayed on the display 113 is shown in FIG. 15(b)(b-2). FIG. 15(c) illustrates a state in which the direction D1 of the display surface 11 has gone out of the second angle range θ2. In this state, the position of the wearable terminal is shown in FIG. 15(c)(c-1), and the display screen displayed on the display 113 is shown in FIG. 15(c)(c-2).

As illustrated in FIG. 15(a) and FIG. 15(b), nothing is displayed on the display 113 until the process of determining the second angle range θ2 performed by the controller 112 in step S202 is completed. After the second angle range θ2 is determined, if the direction D1 of the display surface 11 remains within the second angle range θ2 as shown in FIG. 15(b) over a first predetermined period (Yes in S203), and then if it is determined that the direction D1 of the display surface 11 has a deviation from the second angle range θ2 as illustrated in FIG. 15(c) (Yes in S204), information, for example, information 201a is displayed in a display area 12 of the display 113.

In a case where in the second display control, the display 113 is returned from the sleep state and information is displayed on the display 113, the controller 112 may determine the direction of the information 201a displayed in the display area 12 depending on the gravitational direction detected by the acceleration sensor 105 such that the lower side of the information 201a faces down in the gravitational direction. On the other hand, in a case where in the first display control the display 113 is made to return from the sleep state and information is displayed on the display 113, the information is displayed such that the up-down direction of the information is defined in the direction passing through the two ends of the band of the main part 10 regardless of the gravitational direction.

In FIG. 15(c)(c-2), the gravitational force acts in the negative Z-axis direction, and thus the information 201a is displayed such that the lower side of the information 201a is located on a side of the display area 12 facing in the negative Z-axis direction. That is, in a case where the gravitational force acts in a direction perpendicular to the direction passing through the two ends of the main part 10 where the band 20 is connected to the main part 10, the information 201a may be displayed such that the up-down direction of the information 201a is in the perpendicular direction described above. This makes it possible to display, depending on the gravitational direction, the information 201a in a direction that allows a user to easily watch the information 201a.

Next, control the sleep mode of the wearable terminal 100 is described below with reference to FIG. 16. The control of the sleep mode is performed such that when no operation is performed on the wearable terminal over a particular time period after displaying information on the display 113 is started, the display 113 is switched to the sleep state.

Figure 16:
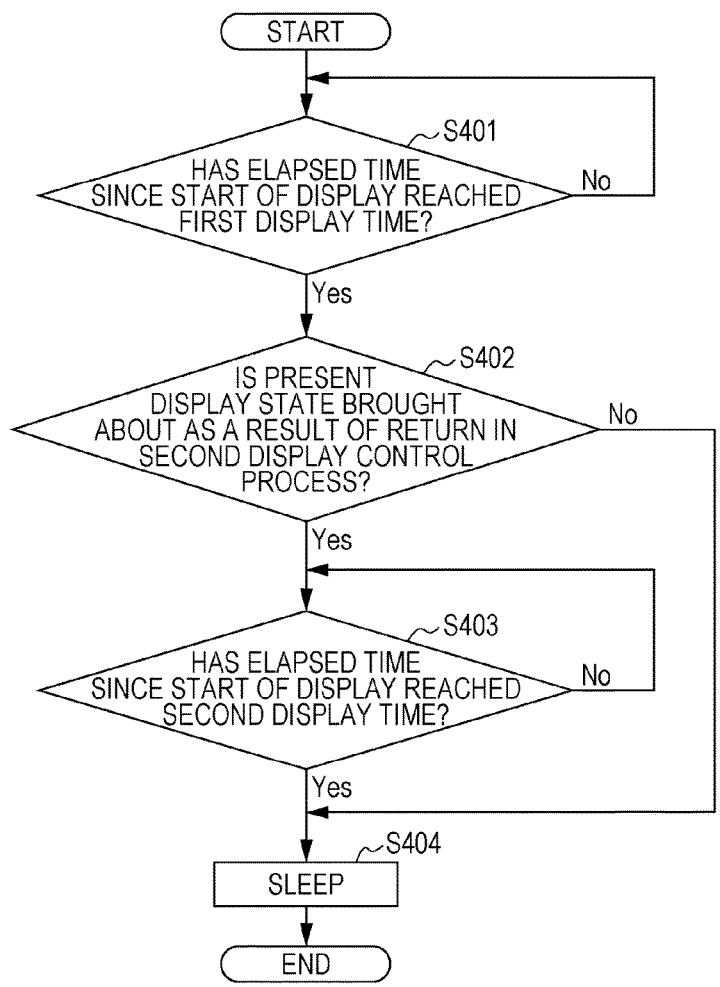
FIG. 16 is a flow chart illustrating an example of a sleep control on the wearable terminal according to the first embodiment.

FIG. 16 is a flow chart illustrating an example of the sleep control on the wearable terminal according to the first embodiment.

As illustrated in FIG. 16, first, the controller 112 determines whether the first displaying period has elapsed since the display 113 is activated (S401).

In a case where the controller 112 determines that the first displaying period has elapsed since the display 113 is activated (Yes in S401), the controller 112 determines whether the activation of the display 113 is performed in response to returning in the second display control (S402). That is, the controller 112 determines whether the current active state of the display 113 is a result of a returning operation in the second display control. On the other hand, in a case where the controller 112 determines that the first displaying period has not yet elapsed since the activation of the display 113 (No in S401), the controller 112 repeats step S401. That is, the controller 112 waits until the first displaying period elapses after the activation of the display 113.

In a case where the controller 112 determines that the display 113 becomes active in response to switching in the second display control (Yes S402), the controller 112 determines whether a second displaying period, longer than the first displaying period, has elapsed after the activation of the display 113 (S403).

On the other hand, in a case where the controller 112 determines that the current active state is not a result of switching in the second display control (No in S402), the controller 112 switches the display 113 to the sleep state. In this case, the controller 112 has determined that the active state is a result of switching in the first display control, and thus the controller 112 switches the display 113 to the sleep state when the first displaying period has elapsed.

Also in a case where the controller 112 determines that the second displaying period has elapsed after the activation of the display 113 (Yes in S403), the controller 112 switches the display 113 to the sleep state (S404).

1-5. Example of Displaying Information

Next, a description is given blow as to examples of information displayed on the display 113 when the display 113 is made to return from the sleep state in the second display control.

Figure 17A:
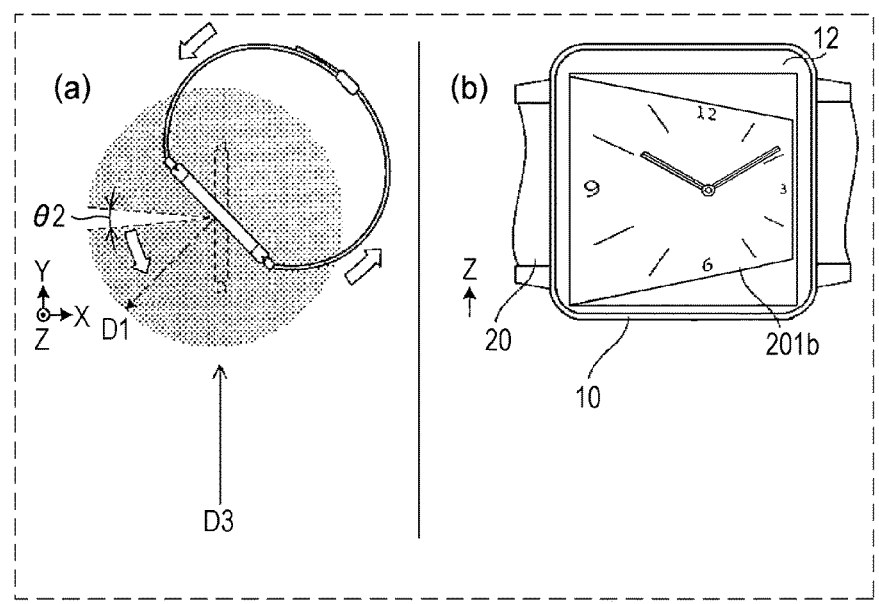
FIG. 17A illustrates an example of a manner of the second display control in which a sleep state is cancelled and displaying is performed on the display.

In FIG. 15, the controller 112 determines the direction of the information 201a displayed on the display area 12 depending on the direction of the gravitational force detected by the acceleration sensor 105 such that the lower side of the information 201a faces down in the gravitational direction. However, the manner of displaying the information 201a is not limited to this. For example, as illustrated in FIG. 17A, the controller 112 may display the information 201b in a trapezoidal shape such that a shorter side thereof faces against a gaze direction D3, and a longer side faces in the opposite direction. The gaze direction D3 of a user may be estimated from information indicating on which arm the wearable terminal 100 is worn and the position of the wearable terminal 100. The controller 112 may set the image size or the character font size to be larger in the second display control as illustrated in FIG. 17B than in the first display control.

Figure 17B:
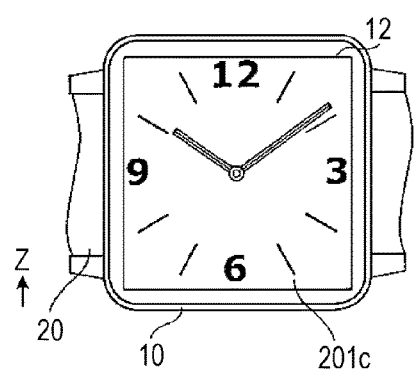
FIG. 17B illustrates an example of a manner of the second display control in which a sleep state is cancelled and displaying is performed on the display.

In the example shown in FIG. 17A and the example shown in FIG. 17B, as in the first embodiment, the information 201b or 201c is displayed in the display area 12 depending on the direction of the gravitational force such that the lower side of the information 201b or 201c faces down in the direction of gravitational force. However, the manner of the displaying the information 201b or 201c in the display area 12 is not limited to this. For example, the information 201b or 201c may be displayed in the display area 12 such that the up-down direction of the information is defined in the direction passing through the two ends of the band of the main part 10.

Although not in the figures, when the display 113 is returned from the sleep state and information is displayed in the second display control, the intensity of the back light of the display 113 may be set to be higher than in the first display control or the contrast of the display 113 may be set to be higher than in the first display control as described above.

1-3. Effects

As descried above, in the wearable terminal 100 according to the present embodiment, it is possible to easily return the display 113 from the sleep state even in a situation in which a wrist on which the wearable terminal 100 is worn is restricted in movement. Thus, even in such a situation, a user is allowed to easily acquire information from the wearable terminal 100.

The controller 112 may set the length of a period during which information is displayed before the display 113 is switched to the sleep state next time such that the length is different for the first display control and the second display control. For example, when the sleep state is cancelled in the second display control, the situation is likely to be such as that in which the wrist is in restriction in movement within the second angle range θ2 in the second period Δt2. More specifically, when the sleep state is cancelled in the second display control, this may occur for example, in a situation in which a user holds a strap or the like in a train, a bus, or the like, or in a situation in which a user holds a handlebar of a bicycle, or in a situation in which a user holds a baggage, or in other similar situations. In such a situation in which movement of a wrist is restricted, it is likely to be difficult for a user to move the display 113 to a position that allows the user to easy watch the display 113 as in the case where the display 113 is in the first angle range θ1. In other words, in such a situation, it is likely to be difficult for a user to watch the display surface 11 of the display 113. In such a case where it is difficult for a user to watch the display surface 11 of the display 113 when the sleep state is cancelled, it is likely to take a long time for the user to read the information displayed on the display surface 11. In the sleep control described above, when displaying is performed in the situation in which the sleep state is cancelled in the second display control and it is likely to be difficult for a user to watch the display surface 11, the displaying period over which the displaying is to be provided before the display is switched to the sleep state next time may be set to be longer than in the case where displaying is provided after the display is made to return from the sleep state in the first display control in which it is likely to be easy for a user to watch the display surface 11, such that the user is allowed to have a sufficiently long time to understand the information displayed on the display surface 11.

1-4. First Modification of First Embodiment

Next, a first modification of the first embodiment is described below.

In the first embodiment, in the process of determining the second angle range θ2, the controller 112 determines, as the second angle range θ2, an angle range defined by the fixed second predetermined angle from the reference direction given by the average direction D20 of the plurality of directions D1 of the display surface 11 detected by the detector 111 in the second period Δt2. However, the second angle range θ2 is not limited to this example. For example, the controller 112 may determine the second angle range θ2 as follows. In a case where there is a periodic change in the plurality of directions D1 of the display surface 11 detected by the detector 111 in the second period Δt2, the controller may determine the second angle range θ2 such that the second angle range θ2 is defined by an amplitude of the periodic change. More specifically, in the determination of the angle range, the amplitude of the change is defined by a maximum value and a minimum value of the rotation angles of the plurality of directions D1 of the display surface 11 detected at different times for each of rotation directions one of which is a rotation directions about a rotation axis given by the first axis A1 and the other one of which is a rotation directions about a rotation axis given by the second axis A2. That is, in determining the second angle range θ2, instead of employing the method according to the first embodiment described above, the method according to the first modification may be employed.

Figure 18:
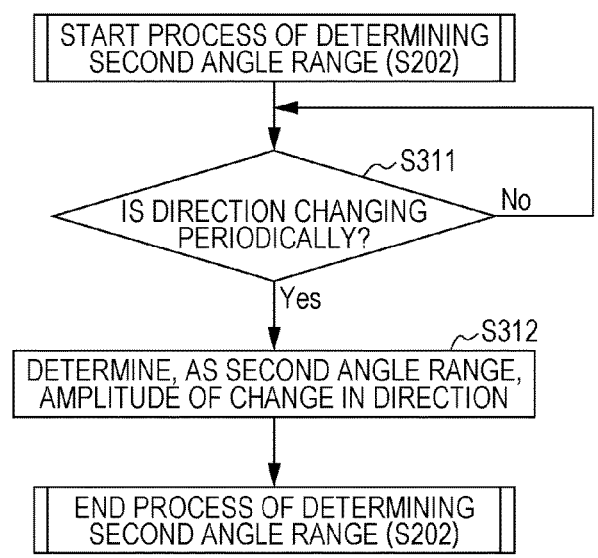
FIG. 18 is a flow chart illustrating an example of a process of determining the second angle range according to a first modification of the first embodiment.
Figure 19:
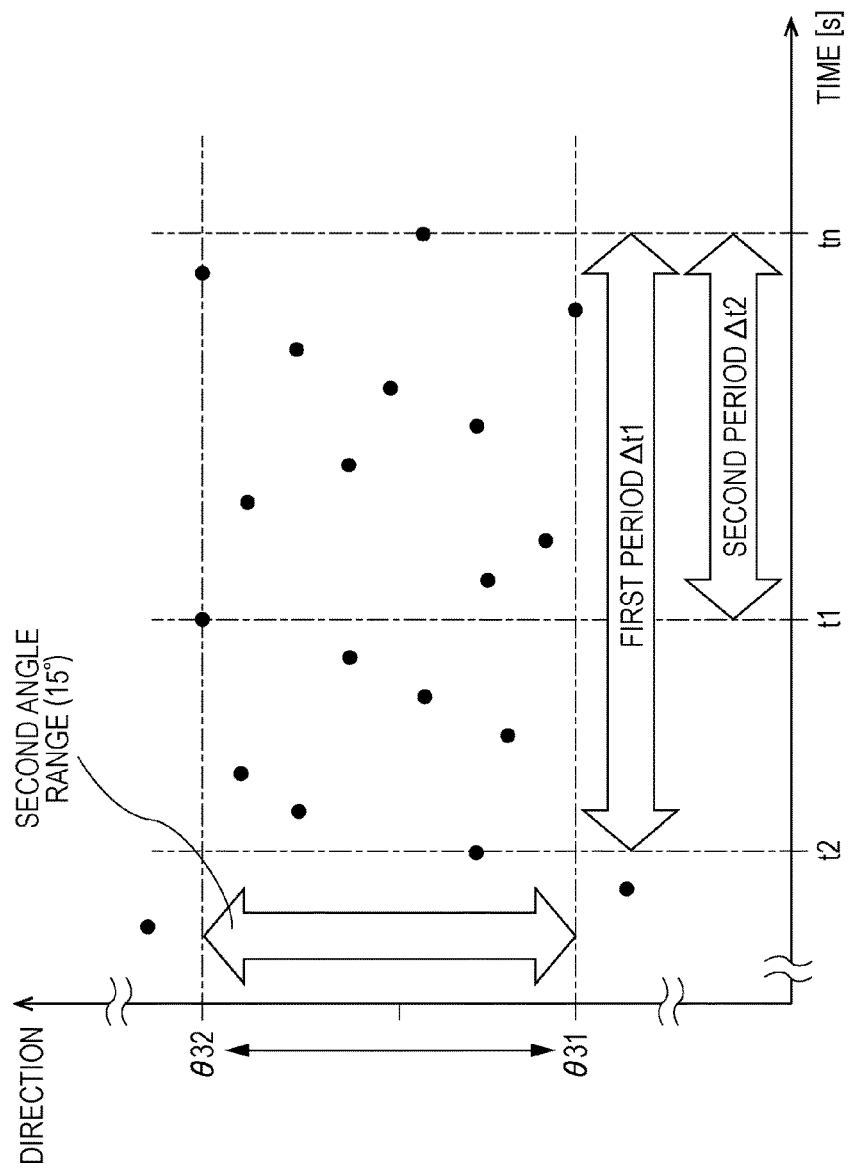
FIG. 19 is a diagram illustrating an example of a direction of a display surface detected by the detector at various times until a present time.

FIG. 18 is a flow chart illustrating an example of the process of determining the second angle range θ2 according to the first modification of the first embodiment. FIG. 19 is a diagram illustrating an example of the direction of display surface detected by the detector at various times until the present time. Note that the directions of the display surface shown in FIG. 19 are detected in a similar manner to the directions of the display surface shown in FIG. 11 described above, and thus a further detailed description thereof is omitted.

As illustrated in FIG. 18, in the process of determining the second angle range θ2 according to the first modification, first, the controller 112 performs a fourth determination that determines whether the plurality of directions D1 of the display surface 11 detected by the detector 111 in the second period Δt2 have a periodic change (S311). More specifically, the controller 112 determines whether there is a periodic change by determining whether there is a periodic change in angle with a particular amplitude in the plurality of directions D1 of the display surface 11 detected by the detector 111 in the second period Δt2.

In a case where a result of the fourth determination indicates that the plurality of directions D1 of the display surface 11 detected by the detector 111 in the second period Δt2 have a periodic change (Yes in S311), the controller 112 determines, as the second angle range θ2, the angle range with the detected amplitude of the change (S312). More specifically, the controller 112 determines the second angle range θ2 by the angle range from the minimum value θ1 to the maximum value θ2 of the plurality of directions D1 of the display surface 11 detected in the second period Δt2 as illustrated, for example, in FIG. 19.

Second Embodiment

A second embodiment is described below with reference to FIG. 20 to FIG. 22.

2-1. Configuration

Figure 20:
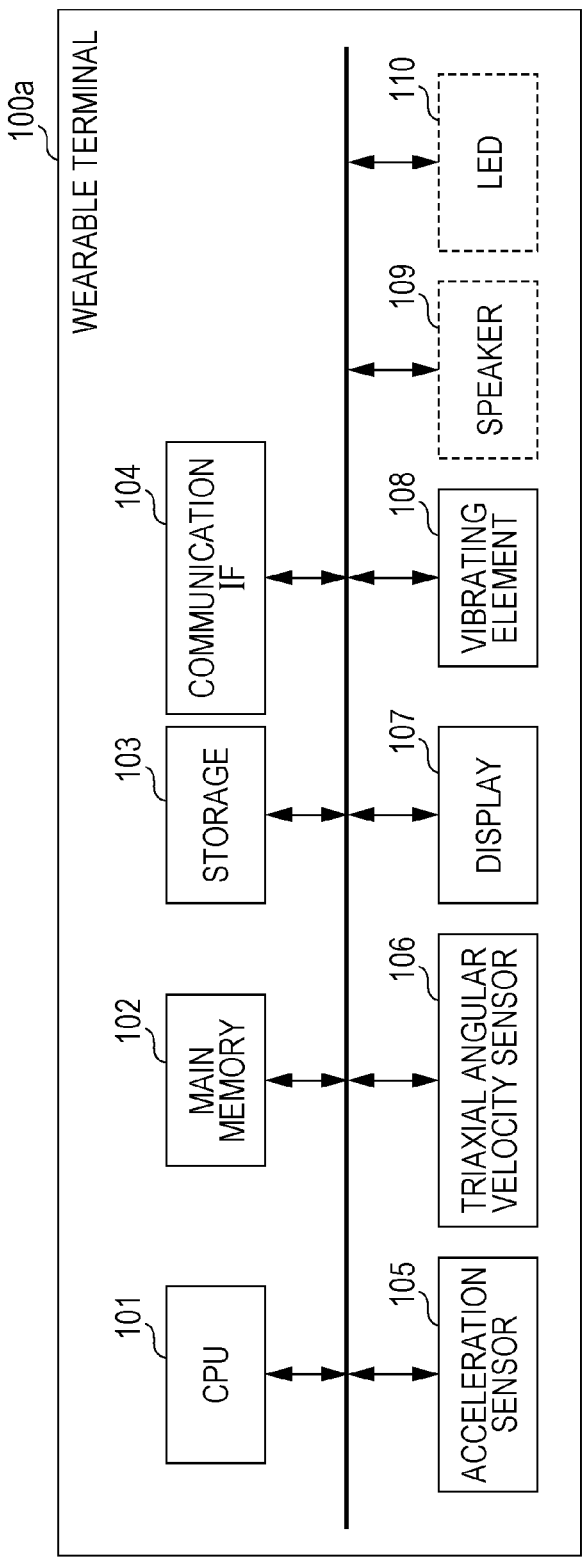
FIG. 20 is a block diagram illustrating a hardware configuration of the wearable terminal according to a second embodiment.
Figure 21:
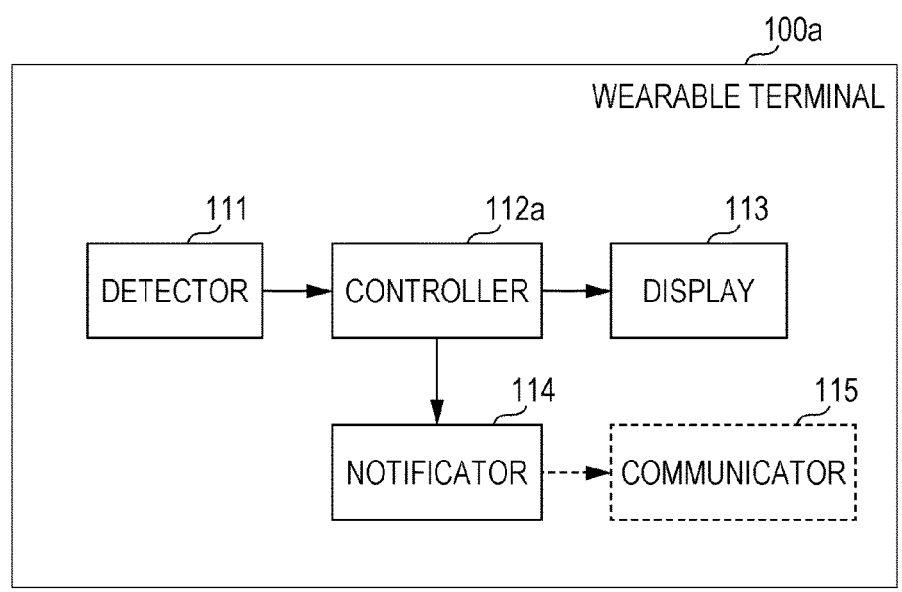
FIG. 21 is a block diagram illustrating a functional configuration of the wearable terminal according to the second embodiment.

FIG. 20 is a block diagram illustrating a hardware configuration of the wearable terminal according to the second embodiment. FIG. 21 is a block diagram illustrating a functional configuration of the wearable terminal according to the second embodiment.

The wearable terminal 100a according to the second embodiment is similar in hardware configuration to the wearable terminal 100 according to the first embodiment, but the wearable terminal 100a further includes a vibrating element 108. The wearable terminal 100a may further include a speaker 109 and a light emitting diode (LED) 110.

The vibrating element 108 is a vibration actuator capable of being turned on/off in response to an input signal.

The speaker 109 outputs a sound.

The LED 110 is a device that emits light.

The wearable terminal 100a is similar in functional configuration to the wearable terminal 100 according to the first embodiment, but the wearable terminal 100 further includes a notificator 114. The wearable terminal 100a may further include a communicator 115. The controller 112a of the wearable terminal 100a is different in functionality from the controller 112 according to the first embodiment.

In a case where a result of the second determination indicates that a plurality of directions D1 of the display surface 11 detected in the first period Δt1 remain in the second angle range θ2, the controller 112a controls the notificator 114 to provide a notification of this fact to a user.

The notificator 114 provides a notification to a user under the control of the controller 112a.

More specifically, the notificator 114 vibrates the wearable terminal 100a to provide a notification to a user. In this case, the notificator 114 is realized by the vibrating element 108.

The notificator 114 may generate a sound to provide a notification to a user. In this case, the notificator 114 is realized by the speaker 109.

The notificator 114 may emit light to provide a notification to a user. In this case, the notificator 114 is realized by the LED 110.

The notificator 114 may provide a notification to an external terminal via the communicator 115 configured to communicate with the external terminal. In this case, the notificator 114 is realized by the CPU, the main memory 102 and/or the like.

The communicator 115 is capable of communicating with an external terminal. The communicator 115 is realized by the communication IF 104.

2-2. Operation

An operation of the wearable terminal 100a configured in the above-described manner is described below with reference to FIG. 22.

Figure 22:
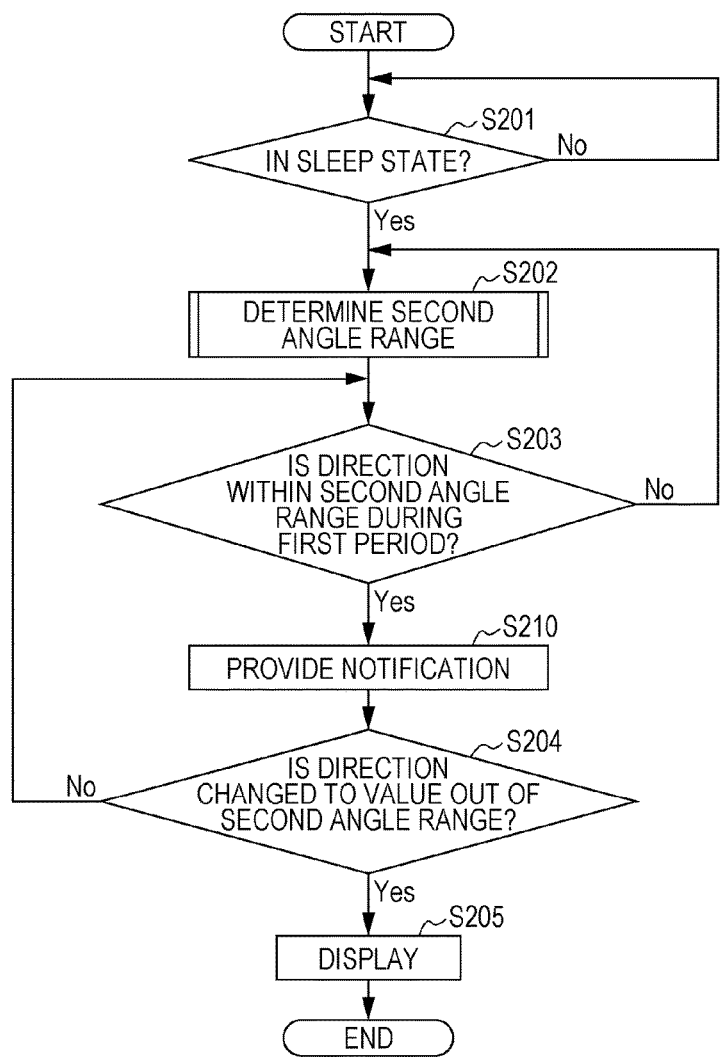
FIG. 22 is a flow chart illustrating an example of a second display control on the wearable terminal according to the second embodiment.

FIG. 22 is a flow chart illustrating an example of the second display control on the wearable terminal according to the second embodiment.

The second display control according to the second embodiment is different from that according to the first embodiment in that step S210 is additionally performed after step S203 is determined affirmatively, and thus the following description focus on step S210.

If the step S203 is determined affirmatively, then the controller 112a notifies this fact to a user by controlling the notificator 114 (S210).

The processing flow then proceeds to step S204.

2-3. Effects

In the wearable terminal 100a according to the present embodiment, in the case where a result of the second determination indicates that a plurality of directions D1 of the display surface 11 detected in the first period Δt1 remain in the second angle range θ2, this fact is notified to a user via the notificator 114. Thus, a user is allowed to know that it is possible to make the display 113 return from the sleep state by changing the position of the wearable terminal 100a such that the direction D1 of the display surface 11 is next rotated in the rotation direction in which the direction D1 of the display surface 11 is deviated from the second angle range θ2. Thus even in a situation in which a wrist, on which the wearable terminal 100a is worn, is restricted in movement, it is possible to easily make the display return from the sleep state simply by changing the position of the wearable terminal 100a after a notification is received from the notificator 114. This makes it possible to make the display 113 return from the sleep state more effectively.

2-4. First Modification of Second Embodiment

Next, a second modification of the second embodiment is described below.

In the second embodiment described above, in the case where a result of the second determination indicates that a plurality of directions D1 of the display surface 11 detected in the first period Δt1 remain in the second angle range θ2, the controller 112a notifies this fact to a user by controlling the notificator 114. However, a notification is provided in a different manner. For example, the third determination may be a determination as to whether the newly detected direction of the display surface is deviated in a direction opposite to the predetermined rotation direction out of the second angle range θ2.

The controller 112a may control the notificator 114 to notify a user that the display 113 is to be made to return from the sleep state when the direction D1 of the display surface 11 detected next time has a change toward the predetermined rotation direction, in a case where the result of the third determination indicates that the newly detected direction of the display surface is deviated in a direction opposite to the predetermined rotation direction out of the second angle range θ2.

FIG. 23 is a flow chart illustrating an example of the second display control according to the second modification of the second embodiment.

The second display control according to the second modification of the second embodiment are different from that according to the second embodiment in that steps S211 and S212 are added after step S203 in the second embodiment such that steps S211 and S212 are performed when step S203 is affirmatively determined, and step S204 in the second embodiment is replaced by step S213. Thus the following description focuses on steps S211 to S213.

If the answer to step S203 is Yes, the controller 112a determines whether the direction D1 of the display surface 11 has changed in a direction (for example, the negative direction) opposite to the predetermined rotation direction (for example, the positive rotation directions) until the direction D1 of the display surface 11 is out of the second angle range θ2 (S211). The positive rotation directions is one of the clockwise direction and the counterclockwise direction. The negative rotation directions is the other one of the clockwise direction and the counterclockwise direction.

In a case where the controller 112a determines that the direction D1 of the display surface 11 has changed in the direction (for example, the negative direction) opposite to the predetermined rotation direction (for example, the positive rotation directions) until the direction D1 of the display surface 11 is out of the second angle range θ2 (Yes in S211), the controller controls the notificator 114 to notify a user that the display 113 is to be made to return from the sleep state when the direction D1 of the display surface 11 detected next time has a change in the predetermined rotation direction (S212). On the other hand, in a case where the controller 112a determines that the direction D1 of the display surface 11 is not out of the second angle range θ2 (that is, the direction D1 of the display surface 11 is in the second angle range θ2) (No in S211), the processing flow returns to step S202.

After step S212, the controller 112 determines whether the direction D1 of the display surface 11 of the display 113 newly detected by the detector 111 has a change in the predetermined rotation direction (the positive rotation directions) (S213). In a case where the direction D1 of the display surface 11 of the display 113 has a change in the predetermined rotation direction (the positive rotation directions), displaying in step S205 is performed, but otherwise the processing flow returns to step S203.

As described above, in the wearable terminal 100a according to the second modification of the second embodiment, when it is determined in step S211 that the direction D1 of the display surface 11 has changed in the direction opposite to the predetermined rotation direction until the direction D1 of the display surface 11 is out of the second angle range θ2, this fact is notified to a user. Thus, the user is allowed to know whether the wearable terminal is in a state in which the display is allowed to be returned from the sleep state by moving the D1 of the display surface 11 in the opposite (negative) direction until the D1 of the display surface 11 is out of the second angle range θ2. This makes it possible to make the display 113 to return from the sleep state more effectively.

OTHER EMBODIMENTS

In the embodiments and modifications described above, each constituent element may be realized using dedicated hardware or may be realized by executing a software program properly prepared for the constituent element. Each constituent element may be realized by a program execution unit such as a CPU, a processor, or the like, by reading out a software program stored in a storage medium such as a hard disk, a semiconductor memory, or the like and executing it. The software for realizing the display control method and the like according to each embodiment may be such a program described below.

That is, the program controls a computer, corresponding to the wearable terminal, to execute a display control method. The computer, corresponding to the wearable terminal, includes a display that displays information in an active state and that does not display the information in a sleep state, a detector that detects a direction of a display surface of the display at different times, a processor. The program causes the processor of the computer to perform: a first determination that determines whether the detected direction by the detector at a latest time is within a first angle range defined by a rotation angle of the display surface from a first reference direction about a rotation axis defined by each of at least two axes in a 3-dimensional space; and a first display control (i) that puts the display in the sleep state in a case where a result of the first determination indicates that the detected direction by the detector at the latest time is out of the first angle range and (ii) that puts the display in the active state in a case where the result of the first determination indicates that the detected direction by the detector at the latest time is within the first angle range. The display control method further causes the processor to perform: a specification that specifies a second angle range which is defined by a rotation angle of the display surface from the second reference direction about a rotation axis defined by each of at least two axes in the 3-dimensional space and which is out of the first angle range, wherein the second reference direction is defined in a direction identified using at least one of directions of the display surface detected at the different times; a second determination that determines whether the plurality of directions of the display surface detected in a first period with a first predetermined length till a present time remain in the determined second angle range; a third determination that determines whether a direction of the display surface newly detected by the detector is out of the second angle range in a case where a result of the second determination indicates that the plurality of directions of the display surface detected in the first period remain in the second angle range; and a second display control that determines the display from the sleep state to the active state in a case where a result of the third determination indicates that the direction of the display surface newly detected by the detector is out of the second angle range, wherein in the second display control, the display is switched even when the newly detected direction of the display surface is out of the first angle range.

The wearable terminal according to one or more aspects of the present disclosure has been described above with reference to embodiments. However, the present disclosure is not limited to those embodiments. It should be apparent to those skilled in the art that various modifications to the embodiments are possible and constituent elements of different embodiments may be combined without departing from the spirit and scope of the present disclosure. Note that such embodiments also fall within the scope of the present disclosure.

The present disclosure is useful for wearable terminals capable of easily returning the display from the sleep state even in a situation in which a wrist on, which the wearable terminal is worn, is restricted in movement.

What is claimed is:

1. A wearable terminal for being worn on a forearm of a user, comprising:
a display that displays information in an active state and that does not display the information in a sleep state;
a detector that detects a direction of a display surface of the display at different times; and
a controller that performs:
a first determination that determines whether the detected direction by the detector at a latest time is within a first angle range defined by a rotation angle of the display surface from a first reference direction about a rotation axis defined by each of at least two axes in a 3-dimensional space; and
a first display control (i) that puts the display in the sleep state in a case where a result of the first determination indicates that the detected direction by the detector at the latest time is out of the first angle range and (ii) that puts the display in the active state in a case where the result of the first determination indicates that the detected direction by the detector at the latest time is within the first angle range;
wherein the controller further performs:
a specification that specifies a second angle range which is defined by a rotation angle of the display surface from a second reference direction about a rotation axis defined by each of at least two axes in the 3-dimensional space and which is out of the first angle range, wherein the second reference direction is defined in a direction identified using at least one of directions of the display surface detected at the different times;

a second determination that determines whether the plurality of directions of the display surface detected in a first period with a first predetermined length till a present time remain in the determined second angle range;

a third determination that determines whether a direction of the display surface newly detected by the detector is out of the second angle range in a case where a result of the second determination indicates that the plurality of directions of the display surface detected in the first period remain in the second angle range; and a second display control that switches the display from the sleep state to the active state in a case where a result of the third determination indicates that the direction of the display surface newly detected by the detector is out of the second angle range, wherein, in the second display control, the display is switched from the sleep state to the active state even when the newly detected direction of the display surface is out of the first angle range.

2. The wearable terminal according to claim 1, wherein the at least one of the directions of the display surface includes a plurality of directions of the display surface each of which is detected at different times by the detector in a second period with a second predetermined length until the present time, and wherein, in the specification, the controller defines the second reference direction by an average direction of the plurality of directions of the display surface detected by the detector in the second period, and specifies as the second angle range, an angle range using predetermined values indicating angles from the second reference direction.

3. The wearable terminal according to claim 1, wherein the at least one of the directions of the display surface includes a plurality of directions of the display surface each of which is detected at different times by the detector in a second period with a second predetermined length until the present time, and wherein, in the specification, the controller performs a fourth determination that determines whether there is a periodic change in the plurality of directions of the display surface detected by the detector in the second period, and in a case where a result of the fourth determination indicates that there is the periodic change, the controller may specify the second angle range from the plurality of detected directions of the display surface such that the second angle range is defined by an angle range defined by a maximum value and a minimum value of the rotation angles of the display surface about each of the at least two axes.

4. The wearable terminal according to claim 1, wherein the display is switched from the sleep state to the active state in the second control in a case where the result of the third determination indicates that the direction of the display surface newly detected by the detector has changed in a predetermined rotation direction about one of the two axes until the direction of the display surface is out of the second angle range.

5. The wearable terminal according to claim 4, wherein the wearable terminal includes a main part including the display, the detector, and the controller, and a band whose two ends are respectively connected to two ends of the main part and which is wrapped together with the main part, in a ring form, around the forearm, and wherein the at least two axes in the 3-dimensional space includes a first axis corresponding to a winding axis about which the band is wrapped, and a second axis corresponding to a rotation axis extending in a direction passing through the two ends, and the predetermined rotation direction is one of rotation directions including a clockwise rotation direction about a rotation axis given by the first axis and a counterclockwise rotation direction about the rotation axis given by the first axis.

6. The wearable terminal according to claim 4, further comprising a notificator, wherein the third determination is a determination as to whether the newly detected direction of the display surface is deviated in a direction opposite to the predetermined rotation direction out of the second angle range, and wherein the controller further controls the notificator to notify a user that the display is to be switched from the sleep state to the active state when the direction of the display surface detected next time has a change toward the predetermined rotation direction, in a case where the result of the third determination indicates that the newly detected direction of the display surface is deviated in a direction opposite to the predetermined rotation direction out of the second angle range.

7. The wearable terminal according to claim 1, wherein the controller displays information on the display in a manner different for the first display control and the second display control.

8. The wearable terminal according to claim 7, wherein the controller sets an image size or a font size to be larger in the second display control than in the first display control.

9. The wearable terminal according to claim 7, wherein the controller sets the intensity of a back light of the display to be higher in the second display control than in the first display control.

10. The wearable terminal according to claim 5, wherein the controller sets the contrast of information displayed on the display to be higher in the second display control than in the first display control.

11. The wearable terminal according to claim 7, wherein, in the first display control, the controller switches the display from the active state to the sleep state when a first displaying period has elapsed since the controller switched the display from the sleep state to the active state in the first display control, and wherein, in the second display control, the controller switches the display from the active state to the sleep state when a second displaying period longer than the first displaying period has elapsed since the controller switched the display from the sleep state to the active state in the second display control.

12. The wearable terminal according to claim 11, wherein in a case where the controller switches the display from the sleep state to the active state in the second display control, the controller determines a length of the second displaying period depending on an application displayed in response to the switching from the sleep state to the active state.

13. The wearable terminal according to claim 1, further comprising a notificator, wherein in a case where the result of the second determination indicates that the plurality of directions of the display surface detected in the first period remain in the second angle range, the controller controls the notificator to provide a notification of this fact to a user.

14. The wearable terminal according to claim 13, wherein the notificator provides the notification to the user by vibrating the wearable terminal.

15. The wearable terminal according to claim 13, wherein the notificator provides the notification to the user by generating a sound.

16. The wearable terminal according to claim 13, further comprising a communicator that communicates with an external terminal, wherein
the notificator sends a notification to the external terminal via the communicator.

17. The wearable terminal according to claim 12, wherein the notificator provides the notification to the user by emitting light.

18. A display control method performed by a wearable terminal, the wearable terminal including
a display that displays information in an active state and that does not display the information in a sleep state,
a detector that detects a direction of a display surface of the display at different times, and
a processor,
the display control method causes the processor to perform:
a first determination that determines whether the detected direction by the detector at a latest time is within a first angle range defined by a rotation angle of the display surface from a first reference direction about a rotation axis defined by each of at least two axes in a 3-dimensional space; and
a first display control (i) that puts the display in the sleep state in a case where a result of the first determination indicates that the detected direction by the detector at the latest time is out of the first angle range and (ii) that puts the display in the active state in a case where the result of the first determination indicates that the detected direction by the detector at the latest time is within the first angle range;
the display control method further causes the processor to perform:
a specification that specifies a second angle range which is defined by a rotation angle of the display surface from a second reference direction about a rotation axis defined by each of at least two axes in the 3-dimensional space and which is out of the first angle range, wherein the second reference direction is defined in a direction identified using at least one of directions of the display surface detected at the different times;
a second determination that determines whether the plurality of directions of the display surface detected in a first period with a first predetermined length till a present time remain in the determined second angle range;
a third determination that determines whether a direction of the display surface newly detected by the detector is out of the second angle range in a case where a result of the second determination indicates that the plurality of directions of the display surface detected in the first period remain in the second angle range; and
a second display control that switches the display from the sleep state to the active state in a case where a result of the third determination indicates that the direction of the display surface newly detected by the detector is out of the second angle range,
wherein, in the second display control, the display is switched from the sleep state to the active state even when the newly detected direction of the display surface is out of the first angle range.

* * * * *